US011415341B1

(12) United States Patent
Melia et al.

(10) Patent No.: US 11,415,341 B1
(45) Date of Patent: Aug. 16, 2022

(54) METHODS AND SYSTEMS FOR GENERATING TIME DEPENDENT TEMPERATURE PROFILE FOR THERMAL STORAGE TANKS

(71) Applicant: HARVEST THERMAL, INC., Kensington, CA (US)

(72) Inventors: Elisabeth Jane Melia, Kensington, CA (US); Evan Green, Escondido, CA (US); Pieter Noordam, San Jose, CA (US); Kelyn Wood, Mountain View, CA (US)

(*) Notice: Subject to any disclaimer, the term of this patent is extended or adjusted under 35 U.S.C. 154(b) by 0 days.

(21) Appl. No.: 17/504,503

(22) Filed: Oct. 19, 2021

Related U.S. Application Data

(60) Provisional application No. 63/093,661, filed on Oct. 19, 2020.

(51) Int. Cl.
*F24H 9/20* (2022.01)
*G05D 23/19* (2006.01)

(52) U.S. Cl.
CPC ........ *F24H 9/2007* (2013.01); *G05D 23/1928* (2013.01)

(58) Field of Classification Search
CPC .... F24H 9/2007; F24H 9/2014; F24H 9/2021; G05D 23/1928
See application file for complete search history.

(56) References Cited

U.S. PATENT DOCUMENTS

| 7,574,120 | B2 | 8/2009 | Patterson et al. | |
| 8,064,757 | B2* | 11/2011 | Patterson | F24D 19/1051 392/441 |
| 8,204,633 | B2 | 6/2012 | Harbin et al. | |
| 2004/0177817 | A1* | 9/2004 | Bradenbaugh | F24H 9/2021 122/13.01 |
| 2011/0211612 | A1* | 9/2011 | Branecky | G01K 1/026 374/115 |
| 2012/0304677 | A1* | 12/2012 | Fukunaga | F24H 9/02 62/238.7 |
| 2013/0047654 | A1* | 2/2013 | Fukunaga | F24H 9/148 62/238.7 |
| 2021/0063053 | A1 | 3/2021 | Nolte et al. | |
| 2021/0278093 | A1* | 9/2021 | Green | F24H 1/14 |
| 2021/0317997 | A1* | 10/2021 | Green | F24D 3/082 |

* cited by examiner

*Primary Examiner* — Marc E Norman

(57) ABSTRACT

Embodiments of the present disclosure provide systems and methods for determining temperature profile associated with a thermal storage tank of a hydronic system. The method performed by a control unit includes monitoring a flow rate and a temperature of a volume of hot water and a volume of cold water entering a thermal storage tank via a set of flowmeters and a set of temperature sensors, respectively. The method includes determining a current location of plurality of water layers in the thermal storage tank. The method further includes computing an average temperature value of the at least the hot water and the cold water withdrawn from the thermal storage tank. The method includes generating a temperature profile of the thermal storage tank based at least on the current location, the flow rate and the temperature of the hot water and the cold water, and the average temperature value.

20 Claims, 11 Drawing Sheets

| TIME STEP (HOUR) | INITIAL STATE 502 | TOP INLET FLOW OF 145°F HOT WATER 504 | CONTINUED INFLOW OF HOT WATER 506 | NO ACTIVITY 508 | BOTTOM INLET FLOW OF COLD WATER 510 | BOTTOM COLD FLOW + CONCURRENT HOT INLET FLOW 512 |
|---|---|---|---|---|---|---|
| | T0 | T1 | T2 | T3 | T4 | T5 |
| TOP BALLOON (B1) | 145 | 144.9 | 144.7 | 143.8 | 143.4 | 144.6 |
| LAYER 1 | 145 | 144.8 | 144.7 | 143.8 | 143.4 | 139.4 |
| LAYER 2 | 145 | 144.6 | 144.7 | 143.8 | 143.4 | 139.3 |
| LAYER 3 | 145 | 144.2 | 144.6 | 143.8 | 143.3 | 139.3 |
| LAYER 4 | 145 | 143.0 | 144.6 | 143.8 | 143.2 | 139.3 |
| LAYER 5 | 145 | 142.1 | 144.5 | 143.8 | 143.2 | 139.1 |
| LAYER 6 | 145 | 142.1 | 144.4 | 143.7 | 143.1 | 133.1 |
| LAYER 7 | 60 | 142.1 | 142.3 | 142.7 | 140.4 | 99.8 |
| LAYER 8 | 60 | 142.1 | 141.5 | 141.7 | 140.4 | 99.3 |
| LAYER 9 | 60 | 140.0 | 141.4 | 140.8 | 141.2 | 88.3 |
| LAYER 10 | 60 | 62.7 | 141.4 | 140.7 | 135.7 | 87.8 |
| LAYER 11 | 60 | 60.0 | 141.4 | 140.7 | 99.5 | 87.7 |
| LAYER 12 | 60 | 60.0 | 141.4 | 140.7 | 98.0 | 87.7 |
| LAYER 13 | 60 | 60.0 | 141.3 | 141.3 | 86.2 | 87.7 |
| BOTTOM BALLOON (B2) | 60 | 60.0 | 136.8 | 138.2 | 84.1 | 83.4 |

METHODS AND SYSTEMS FOR GENERATING TIME DEPENDENT TEMPERATURE PROFILE FOR THERMAL STORAGE TANKS

This invention was made with Government support under grant 1938079 awarded by the National Science Foundation. The Government has certain rights to this invention.

TECHNICAL FIELD

The present disclosure relates to hydronic systems and, more particularly to the hydronic systems and methods for determining temperature profile for a thermal storage tank with integrated hydronic heating, cooling and efficient energy use management for residential, commercial, and/or industrial use.

BACKGROUND

Hydronic systems are typically thermo-fluid dynamic systems, which are configured for home, commercial, and/or industrial use. The hydronic systems employ water as a heat transfer fluid for heating or cooling the interiors of the facilities.

The fluid (i.e. water) may be stored in a stratified manner (i.e., separate layers) in a hot water storage tank of the hydronic system. As such, a temperature profile of water stored in a stratified manner in the hot storage tank is to be determined for estimating the amount of usable hot water, time-period and energy for reheating the water stored in the hot water storage tank. Traditionally, the hot water storage tanks deployed in residential, commercial or industrial facilities for operational use include temperature sensors, (e.g., one temperature sensor), located at a fixed location of the hot water storage tank. However, in such case, the temperature of the water layer that is present at the location of the temperature sensor is determined for a given point in time. This does not provide information on the temperature of other layers in the tank. To overcome the aforementioned drawback, the hot water storage tank may be installed with multiple temperature sensors (which forms a sensor ladder) in the hot water storage tank. In this scenario, temperature of the water layers at multiple locations in the hot water storage tank may be measured as the water inflow and outflow into/from the hot water storage tank. The temperature of the water layers at multiple locations in the hot water storage tank is utilized for generating the temperature profile of the hot water storage tank. However, mounting multiple temperature sensors at various points in the hot water storage tank for determining the temperature profile makes the system uneconomical and more vulnerable to technical failures.

Additionally, at various points of time in a day, there may be inflow or outflow of water in the hot water storage tank. Further, based on the inflow or outflow of the water in the hot water storage tank, the location of the water layers in the hot water storage tank may change (either traverse upwards/downwards) which alters the temperature profile of the hot water storage tank. To this effect, usage of one or multiple temperature sensors throughout the tank for determining the thermal profile without accounting for inflow or outflow data results in a static measurement of the temperature at one or multiple locations. As such, the temperature profile of the tank determined based on the static measurement of temperature at one location or multiple locations may be inaccurate. Moreover, lack of accuracy in determining the temperature profile of the tank results in inability to estimate the amount of energy stored in the hot water storage tank and also increases operating cost, emissions and usage of electrical power supply or other form of energy to recharge the water at undesirable conditions.

Therefore, there is a need for techniques which can overcome one or more limitations stated above in addition to providing other technical advantages.

SUMMARY

Various embodiments of the present disclosure provide systems and methods for determining temperature profile of a thermal storage tank, and its variation over time, with integrated hydronic heating, cooling and efficient energy use management for various applications.

In an embodiment, a system is disclosed. The system includes a thermal storage tank. The thermal storage tank includes one or more inlets and one or more outlets. The thermal storage tank is configured to store at least hot water and cold water in the form of a plurality of water layers. The plurality of water layers includes multiple fixed volume portions stacked between a pair of variable volume portions. The system includes a set of temperature sensors mounted at the one or more inlets and the one or more outlets of the thermal storage tank. Further, the system includes a set of flowmeters mounted at the one or more inlets and the one or more outlets of the thermal storage tank. The system further includes a control unit communicably coupled to the set of flowmeters and the set of temperature sensors. The control unit is configured to at least monitor a flow rate of at least a volume of hot water and a volume of cold water entering and exiting the thermal storage tank over a time step via the set of flowmeters. A position of the plurality of water layers within the thermal storage tank is altered based on water entering and exiting the thermal storage tank. The control unit is configured to monitor a temperature of at least the volume of hot water and the volume of cold water entering and exiting the thermal storage tank over the time step via the set of temperature sensors. Further, the control unit is configured to determine a current location of the plurality of water layers in the thermal storage tank based at least on volume of water entered within and exited from the thermal storage tank and dimensions of the thermal storage tank. The control unit is further configured to compute an average temperature value of the at least the hot water and the cold water withdrawn from the thermal storage tank over the time step. The control unit is configured to electronically generate a temperature profile of the thermal storage tank for the time step based at least on the current location of the plurality of water layers, the flow rate and the temperature of at least the hot water and the cold water, and the average temperature value.

In another embodiment, a method is disclosed. The method performed by a control unit includes monitoring a flow rate of at least a volume of hot water and a volume of cold water entering a thermal storage tank over a time step via a set of flowmeters. A position of plurality of water layers within the thermal storage tank is altered based on water entering and exiting the thermal storage tank. The method includes monitoring a temperature of at least the volume of hot water and the volume of cold water entering the thermal storage tank over the time step via a set of temperature sensors. Further, the method includes determining a current location of the plurality of water layers in the thermal storage tank based at least on the volume of water entered within and exited from the thermal storage tank and dimensions of the thermal storage tank. The method further includes computing an average temperature value of the at least the hot water and the cold water withdrawn from the thermal storage tank over the time step. The method includes generating a temperature profile of the thermal storage tank for the time step based at least on the current location of the plurality of water layers, the flow rate and the temperature of at least the hot water and the cold water, and the average temperature value.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers:

FIG. 5 illustrates a table depicting variation of temperature profile of the thermal storage tank for over a period of time, in accordance with an embodiment of the present disclosure;

Figure 1:
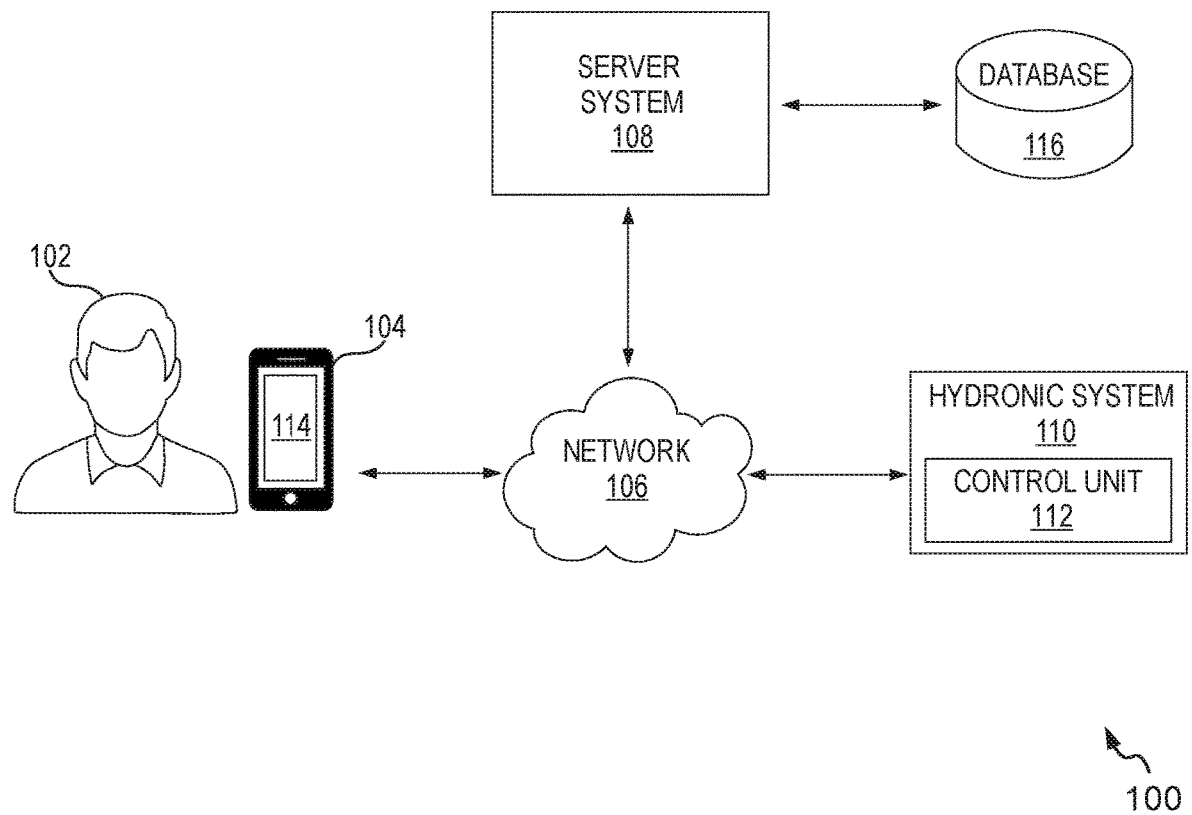
FIG. 1 is an example representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide hydronic systems and methods for determining a temperature profile of a thermal storage tank with integrated hydronic heating, cooling and efficient energy use management for residential, commercial, and/or industrial use. In an embodiment, the system includes a thermal storage tank. The thermal storage tank includes one or more inlets and one or more outlets. The thermal storage tank is configured to store at least hot water and cold water in form of a plurality of water layers. The plurality of water layers includes multiple fixed volume portions stacked between a pair of variable volume portions. The system includes a set of temperature sensors and a set of flowmeters mounted at the one or more inlets and the one or more outlets of the thermal storage tank.

Further, the system includes a control unit communicably coupled to the set of flowmeters and the set of temperature sensors. The control unit is configured to at least monitor a flow rate and a temperature of at least the volume of hot water and the volume of cold water entering and exiting the thermal storage tank over a time step via the set of flowmeters and the set of temperature sensors, respectively. It should be noted that a position of the plurality of water layers within the thermal storage tank is altered based on water entering and exiting the thermal storage tank. The control unit determines a current location of the plurality of layers in the thermal storage tank based at least on the volume of water entered within and exited from the thermal storage tank and dimensions of the thermal storage tank. More specifically, the current location of each water layer of the plurality of water layers in the thermal storage tank is determined when a portion of water stored in a variable volume portion of the pair of variable volume portions is moved to a constant volume portion located adjacent to the variable volume portion. It should be noted that the portion of water in the variable volume portion is moved to the constant volume portion when the variable volume portion attains a filled condition. Thereafter, the control unit is configured to compute an average temperature value of the at least the hot water and the cold water withdrawn from the thermal storage tank over the time step. The control unit generates a temperature profile of the thermal storage tank for the time step based at least on the current location of the plurality of water layers, the flow rate and the temperature of the at least hot water and cold water, and the average temperature value. Additionally, the control unit is configured to generate the temperature profile as a function of time for the thermal storage tank based at least on the current location of each water layer of the plurality of water layers in the thermal storage tank, the flow rate and the temperature of the hot water and the cold water at a series of time step and the average temperature value measured at each time step.

Various embodiments of the present invention are described hereinafter with reference to FIG. 1 to FIG. 8.

FIG. 1 is an example representation of an environment 100 related to at least some example embodiments of the present disclosure. The environment 100 includes a user 102. The user 102 may be an individual or an entity, who is in need of a hot water supply or a cold water supply from a hydronic system 110 or who is need of conditioning an enclosure (see, 212 of FIG. 2A). The user 102 may be associated with a user device 104 to provide an input information for operating the hydronic system 110 via a network 106. The network 106 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

The input information may include, but not limited to, a requirement of hot water, a quantity and temperature of required water, a variation in a temperature of the hot water supply or the chilled water supply, a variation in the temperature of conditioning the enclosure and/or any other information required for operation of the hydronic system 110, and information regarding cost of electricity or emissions of electricity for example at different times, or other factors. Specifically, the user 102 may provide the input information to a server system 108 using an interactive analytic application 114 (hereinafter interchangeably referred to as 'application 114') made available at the user device 104. The user device 104 may include devices, such as laptops, tablets, desktops, smartphones, wearable devices, workstation terminals or other computing devices with network interfaces, such as micro-PCs, smart watches, and the like.

The server system 108 is configured to host and manage the application 114, which is accessible to the user device 104. Further, the server system 108 is configured to communicate with the hydronic system 110, and provides instructions to the hydronic system 110 to operate in a desired manner based at least on the input information received from the user 102 via the application 114. The operations associated with the hydronic system 110 are further explained in detail.

In one embodiment, the application 114 is configured to generate and dynamically update a dashboard and/or a look-up table (not shown in Figures) by including the input information provided by the user 102. In another embodiment, the application 114 is also configured to generate and dynamically update the dashboard by including estimated costs associated with operation of the hydronic system 110 based on the user inputs in the application 114. In an embodiment, the input information may be provided by the user 102 frequently via the application 114, and the estimated costs for operating the hydronic system 110 may be fetched through another endpoint in the application 114 (not shown in Figures).

The environment 100 further includes a database 116 communicably coupled to the server system 108. The database 116 is configured to store information pertaining to the input information provided by the user 102. The input information may be the information pertaining to the temperature of hot water and cold water required by the hydronic system 110 or the temperature for conditioning the enclosure. The database 116 may also be configured to store data pertaining to the determined temperatures, volumes of water required at a given time, capacities of the storage tanks, operating cycles (i.e. on-peak and off-peak operation cycles), and the like. The database 116 may store information on times when it will be less expensive to operate the heating unit, or when operating the heating unit will have a lower environmental impact. For example, the database 116 may store information on times when the electricity from the grid is primarily sourced from renewable sources and hence has lower emissions, providing clean, free electricity to operate the system and so on. In one implementation, the cost of the power source may represent the price of the power source, the emissions due to that power source or any other parameter. In an embodiment, the cost, emissions and schedule of the power source may be stored as a look up table (not shown in Figures). The database 116 may be maintained by a third party or embodied within the server system 108.

Further, the hydronic system 110 includes a control unit 112 that controls operation of the hydronic system 110 based on the input information from the user 102 and/or information from a temperature sensing device operatively coupled to the control unit 112. It shall be noted that the control unit 112 can be a standalone component operating apart from the hydronic system 110 for controlling operations of the hydronic system 110. In some embodiments, the control unit 112 may actually be incorporated, in whole or in part, into one or more parts of the environment 100, for example, the server system 108. In another embodiment, the control unit 112 may include an interface (not shown in FIGS.) for receiving user inputs. In this scenario, the user 102 may provide input information as discussed above, by using the interface configured on the control unit 112, thus mitigating the use of the user device 104 for providing the input information.

The hydronic system 110 is configured to perform one or more operations described herein. In particular, the control unit 112 is configured to adapt one or more parameters of the hydronic system 110 based on receipt of the input information via at least one of the user device 104, the interface associated with the control unit 112, and the temperature sensing device. In one example, the user 102 may provide the input information pertaining to conditioning of the enclosure (see, 212 of FIG. 2) or requirement of hot water or cold water as explained above.

More specifically, the control unit 112 operates the hydronic system 110 based on state of charge (SoC) of the water (i.e. heat transfer medium) within the hydronic system 110 to achieve the required temperature for conditioning the enclosure and the hot water delivery for domestic usage.

More specifically, the control unit 112 is configured to track parameters such as, but not limited to, a flow rate of hot water or cold water entering and exiting a storage tank associated with the hydronic system 110, a temperature of the water at various locations (as water is stored in form of a plurality of water layers) within the hydronic system 110, a current location of each of the water layers within the hydronic system 110, and the like at each time step (e.g., hourly). Thereafter, the control unit 112 electronically generates the SoC and/or a temperature profile for the hydronic system 110 based at least on the aforementioned parameters. As a result, the control unit 112 is configured to manage the hot or cold water availability while maximizing efficiency, load shifting from time periods of higher costs and emissions to time periods of lower costs (i.e. off-peak operation cycle), and the like, based at least on the temperature profile associated with the hydronic system 110. Further, the control unit 112 is configured to monitor the variation in the temperature profile associated with hydronic system 110 over a period of time.

Further, the control unit 112 operates a heating unit associated with the hydronic system 110 to either heat or cool the water to meet the desired requirements based at least on the SoC and/or temperature profile or other relevant parameter, while also optimizing the performance of operation of the hydronic system 110. Furthermore, the operations associated with the server system 108, and the control unit 112 of the hydronic system 110 for tracking temperature profile associated with the hydronic system 110 are further explained in detail.

The number and arrangement of systems, devices, and/or networks shown in FIG. 1 are provided as an example. There may be additional systems, devices, and/or networks, fewer systems, devices, and/or networks, different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2A:
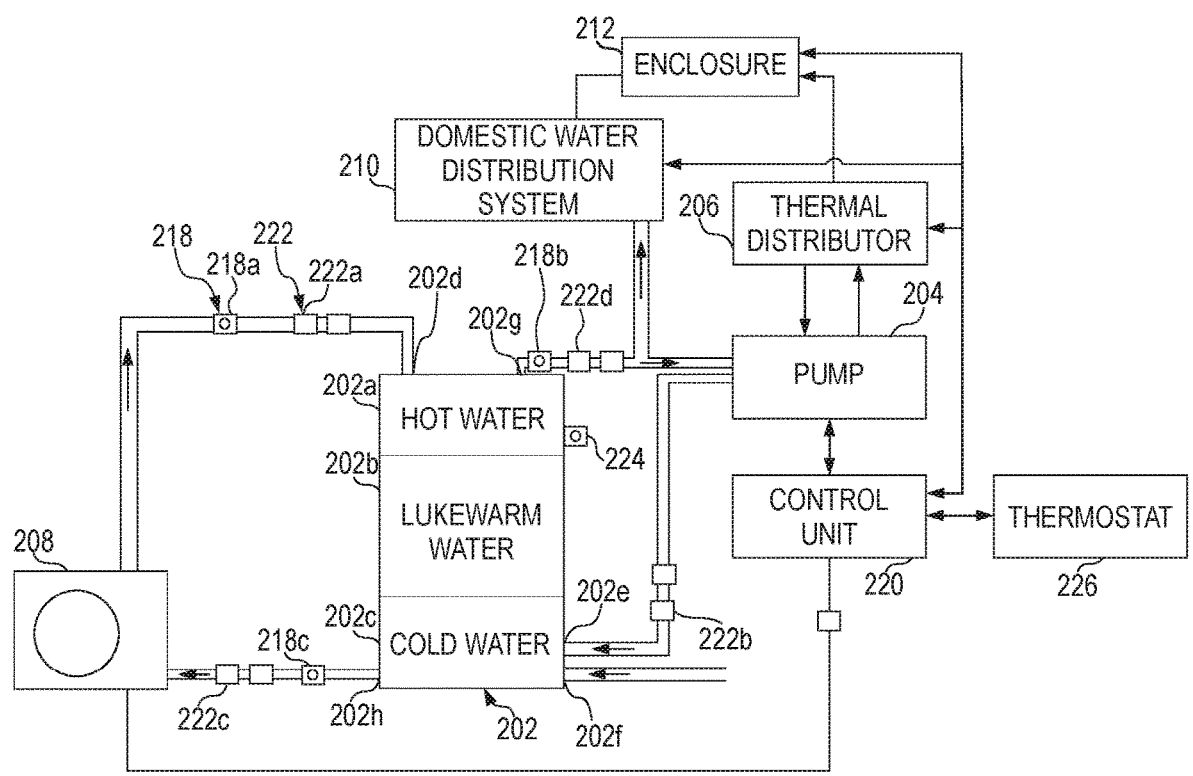
FIG. 2A is a schematic representation of a hydronic system, in accordance with an embodiment of the present disclosure.
Figure 2B:
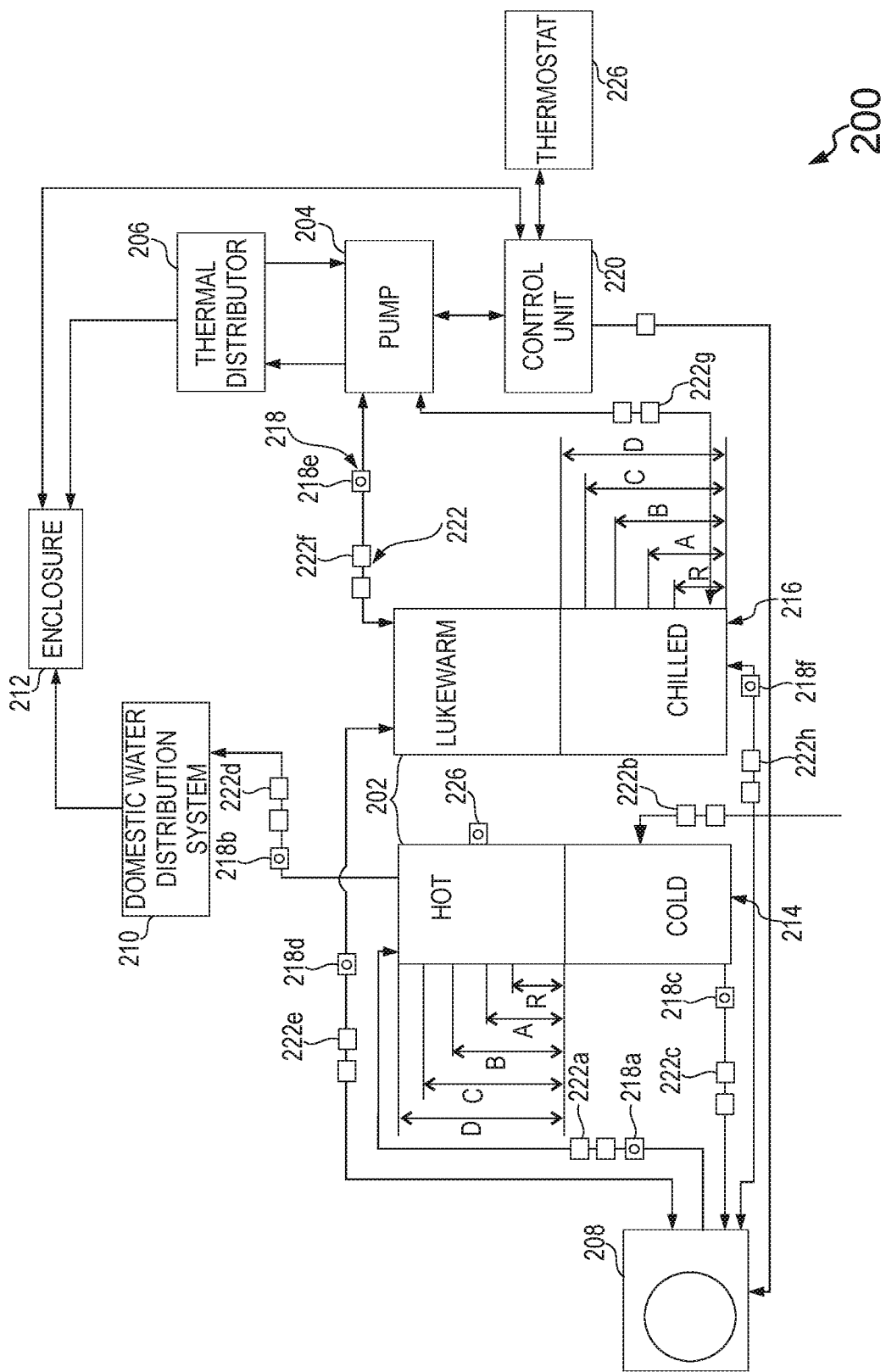
FIG. 2B is a schematic representation of a hydronic system, in accordance with another embodiment of the present disclosure.

FIGS. 2A and 2B are schematic representations of the hydronic system 200, in accordance with some embodiments of the present disclosure. The hydronic system 200 is an example of the hydronic system 110 of FIG. 1. The hydronic system 200 (hereinafter interchangeably referred to as "the system 200") includes a thermal storage tank 202. The thermal storage tank 202 (hereinafter interchangeably referred to as "the tank 202") is configured to store fluid and/or heat transfer medium (i.e. water) therein. More specifically, the thermal storage tank 202 may be divided into a compartment (i.e. a top portion 202a) for storing the hot water, a compartment (i.e. a middle portion 202b) for storing a lukewarm (or tepid) water and a compartment (i.e. a bottom portion 202c) for storing the chilled water. The thermal storage tank 202 may be configured with a thermal shielding surface for maintaining the temperature of the water therein. In one configuration, cold water may also be stored in the bottom portion 202c as per design feasibility and requirement. Further, such type of storage of water exhibiting temperature difference (i.e., hot water, tepid water, and cold water) in the tank 202 may be due to formation of thermocline layers (referenced as a line within the tank 202).

In one implementation, the hot water may be the water heated to a temperature from about 50° C. to about 95° C. or any other temperature as per feasibility and requirement. In another implementation, the lukewarm water may be the water available in the room temperature, with the temperature range of about 25° C. to about 30° C. or any other temperature as per requirement. In yet another implementation, the chilled water and/or the cold water may be the water cooled to the temperature 10° C. or any other temperature as per requirement. In another implementation, the cold water may be the water cooled to the temperature range of about 11° C. to about 20° C. or any other temperature as per requirement.

The thermal storage tank 202 is configured with one or more inlets 202d, 202e and 202f, and one or more outlets 202g and 202h to route the water from or into the tank 202. In one implementation, the inlet 202d and the outlet 202g may be configured at the top portion 202a of the tank 202. Further, the inlets 202e and 202f and the outlet 202h may be configured at the bottom portion 202c of the tank 202.

Further, the thermal storage tank 202 is fluidically coupled to a pump 204, to the domestic hot water system 210 and to the heating unit 208. The pump 204 is further fluidically coupled via conduits, to a thermal distributor 206 and the enclosure 212. As such, the pump 204 is configured to circulate or route the hot water, the chilled water and the lukewarm water suitably within the system 200. In one configuration, the pump 204 may be a unit selected from group including a positive displacement pump, a peristaltic pump, a centrifugal pump or any other pump as per design feasibility and requirement.

In one configuration, the thermal storage tank 202 may be divided into a hot storage tank 214 and a cold storage tank 216 (e.g. as shown in FIG. 2B). The hot storage tank 214 may be configured to store the hot water (e.g., at a top portion 202a as shown in FIG. 2A) and the cold water (e.g. at a bottom portion 202c as shown in FIG. 2A). The thermocline layer will separate the hot water and the cold water. The cold storage tank 216 may be configured to store the lukewarm water and the chilled water. The thermocline layer will separate the lukewarm water and the cold water. The hot storage tank 214 and the cold storage tank 216 may be fluidically coupled to the pump 204 for enabling circulation of the hot water and the chilled water suitably.

Referring back to FIG. 2A, the system 200 may be configured with a set of flowmeters 222 mounted at the one or more inlets and the one or more outlets of the thermal storage tank 202. The set of flowmeters 222 includes a first set of flowmeters 222a, 222b, 222c and 222d mounted at the inlet and outlet of the thermal storage tank 202. The first set of flowmeters 222a, 222b, 222c and 222d is configured to monitor the volume of the water entering and exiting the thermal storage tank 202 over time and allow a control unit 220 to determine the volume of hot water in the tank 202. The first flowmeters 222a, 222b, 222c and 222d may be one of an optical sensor, a mechanical sensor or any other sensor configured for monitoring the water flow within the conduits entering and exiting the tank 202. The system 200 may also include a set of temperature sensors 218. The set of temperature sensors 218 includes a first set of temperature sensors 218a, 218b, and 218c mounted to the conduit exiting and entering the portion of the tank 202. The first set of temperature sensor 218a-218c is configured to monitor the temperature of the water exiting or entering the tank 202. In one configuration, the flowmeters 222a, 222b, 222c and 222d and the first set of temperature sensors 218a, 218b and 218c may also be suitably incorporated in the thermal storage tank 202 (not shown in Figures).

As explained above, the hot storage tank 214 may be mounted with the first set of flowmeters 222a-222d and the first set of temperature sensors 218a-218c at corresponding inlets and outlets of the hot storage tank 214 (as shown in FIG. 2B). Further, the set of flowmeters 222 may include a second set of flowmeters 222e, 222f, 222g and 222h mounted at corresponding inlets and outlets of the cold storage tank 216 (as shown in FIG. 2B). The second set of flowmeters 222e-222h is configured to monitor the volume of the chilled and/or code water entering and exiting the cold storage tank 216 over time and allow the control unit 220 to determine the volume of chilled and/or cold water in the cold storage tank 216. The second set of flowmeters 222e-222h may be one of an optical sensor, a mechanical sensor or any other sensor configured for monitoring the chilled water flow within the conduits entering and exiting the cold storage tank 216. Further, the set of temperature sensors 218 may include a second set of temperature sensors 218d, 218e and 218f mounted to conduit exiting or entering the portion of the tank containing the chilled water and exiting or entering the portion of the tank containing the lukewarm water (as shown in FIG. 2B). The second set of temperature sensors 218d-218f is configured to monitor the temperature of the water exiting or entering the cold storage tank 216. In one configuration, the flowmeters 222e-222h and the second set of temperature sensors 218d-218f may be suitably incorporated in the thermal storage tank 202.

Further, the system 200 includes a first temperature sensor 224 mounted to the tank 202 (or the hot storage tank 214). The first temperature sensor 224 is configured to monitor the temperature of the hot water within the tank 202. In one configuration, the conduit extending from the hot storage tank 214 for supplying the hot water may be directly connected to the enclosure 212 (not shown in Figures). In one configuration, the conduit extending from the cold storage tank 216 for supplying the chilled water to the thermal distributor 206 may be directly connected instead to the domestic water distribution system 210 (not shown in Figures). The thermal distributor 206 on receiving either of the hot water or the chilled water via the pump 204 distributes the heat content to the enclosure 212 for conditioning. The thermal distributor 206 may be a blower (not shown in the Figures) configured for distributing the heat content into the enclosure 212.

The system 200 also includes the heating unit 208 configured for generating either the hot water or the chilled water. The hot water and the cold water generated in the heating unit 208 are routed back to the thermal storage tank 202 or the hot storage tank 214 and the cold storage tank 216 respectively. In one configuration, the heating unit 208 receives cold water from (i.e. the bottom portion) the hot storage tank 214 which would be heated for generating the hot water. The generated hot water is routed to the hot storage tank 214 (i.e. the top portion), for recharging the hot water. In another configuration, the heating unit 208 receives lukewarm water from (i.e. the top portion) the cold storage tank 216, which would be cooled to generate the chilled water. The chilled water is circulated back to the cold storage tank 216 (i.e. to the bottom portion).

In one implementation, recharging of the hot water and/or the cold water may refer to increasing the volume of the hot water and/or the cold water for use in the system 200. In another implementation, recharging of the hot water and/or the cold water may refer to raising the heat content in the hot water and/or the cold water for use in the system 200. Thus, the term recycling may be considered to apply, based on the necessity or requirement of the system 200.

The system 200 also includes the control unit 220 communicably coupled with the thermal storage tank 202, the hot storage tank 214, the cold storage tank 216, the pump 204, the thermal distributor 206, the domestic water distribution system 210, the heating unit 208 and the enclosure 212. The control unit 220 is configured to control operations of the components in the system 200 for ensuring optimal operational efficiency, while incurring minimal operation costs, emissions or any other parameter, which would be further explained in detail. The control unit 220 is also configured to receive the input information from the user 102, based on which the control unit 220 may operate the system 200. The input information provided by the user 102, which relates to the temperatures is received through a thermostat 226. The thermostat 226 may record the required thermal value or temperature value in the system 200 suitably, and provide such data to the control unit 220. In one implementation, the control unit 220 may automatically determine the requirements of the enclosure 212 and accordingly, operate the system 200 for conditioning the enclosure 212 suitably. Further, the user 102 may provide information through the application 114 installed in the user device 104. For example, the information provided through the application 114 may be volume of hot water or cold water etc.

Figure 3A:
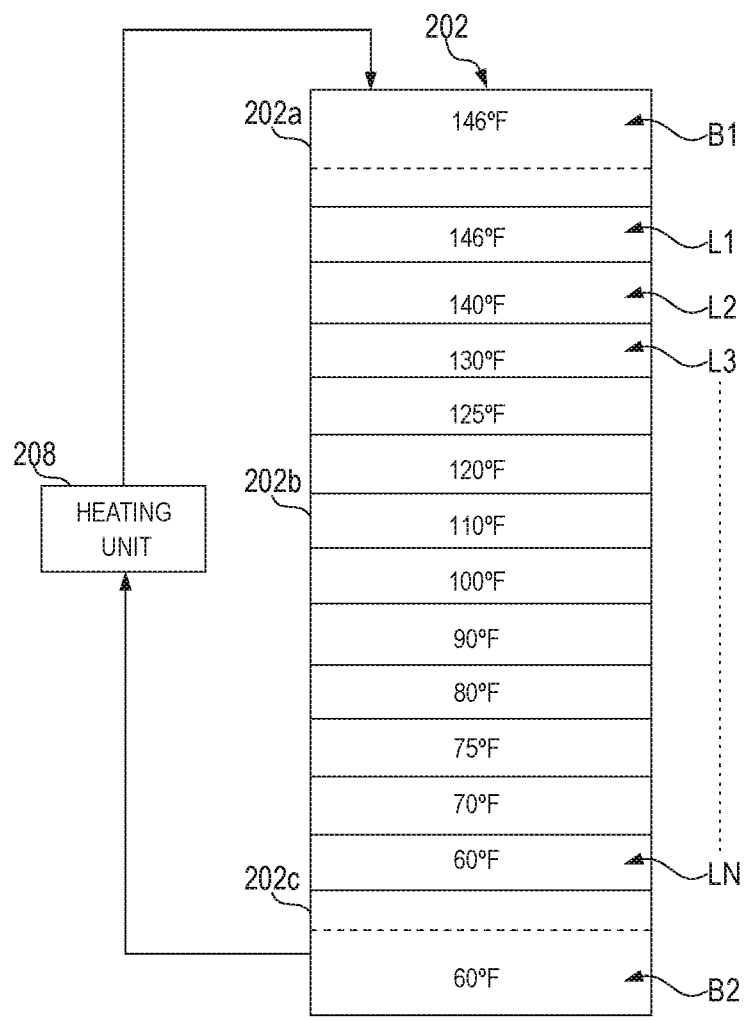
FIGS. 3A and 3B, collectively, illustrate a schematic representation of a thermal storage tank storing water in form of a plurality of water layers, in accordance with an embodiment of the present disclosure.

Referring to FIG. 3A a schematic representation of the thermal storage tank 202 storing the water in form of a plurality of water layers is illustrated, in accordance with an embodiment of the present disclosure. The thermal storage tank 202 is coupled to the heating unit 208. As explained above, the water in the tank 202 may be stratified (i.e., divided into separate layers) based on the temperature. As shown, the water in the thermal storage tank 202 is stored in form of multiple water layers to manage mass flow through the tank 202 which will be explained further in detail. Specifically, the thermal storage tank 202 is divided into a plurality of water layers. The plurality of water layers includes multiple fixed volume portions (represented as water layers L1, L2 . . . Ln) with known or assumed initial temperatures and a pair of variable volume portions also with known or assumed initial temperatures. The variable volume portions are referred to as balloons (represented as balloons B1, and B2). In one configuration, the balloons B1, and B2 (i.e. variable volume portions) are positioned at the top portion 202a and the bottom portion 202c of the tank 202, respectively. Alternatively, the balloons B1 and B2 may be located at different positions in the tank 202 based on the inlet and outlet port locations. This configuration is used to calculate at each time step the mass flow through layers due to water draws for purposes such as domestic hot water or heating use or other purposes or to recharging the tank with water at different temperatures. At each time step thermal transfer calculations can also be made to update the temperature of each layer.

It should be noted that the multiple constant volume portions L1, L2 . . . Ln are stacked between the pair of variable volume portions B1 and B2. The thermal storage tank 202 configured to store the water in form of the layers conforms to a layered thermal model. This layered thermal model of the thermal storage tank 202 is used for generating the temperature profile of water in the tank 202 as it varies over time and as water of different temperatures enters and exits the tank 202, which will be explained further in greater detail. As shown in FIG. 3A, the water layers are associated with exemplary temperature values. The temperature value of each of the water layers provides the temperature profile of water in the tank 202. Further, the layered thermal model of the tank 202 mitigates the challenges due to fractional flows or non-integer multiple of a constant volume portion. For example, each of the constant volume portion (L1, L2 . . . Ln) may have a volume of 1 gallon, and flows over the time step may only be a fraction of 1 gallon, or perhaps a non-integer multiple of 1 gallon. To eliminate the challenges faced due to fractional flows, the balloons B1 and B2 are located at the top portion 202a and the bottom portion 202c, respectively. The sum of volume of the balloons B1 and B2 is constant. In other words, the sum of the volume of the balloons B1 and B2 is equal to one constant volume portion (e.g., volume of the water layer L1). As such, the fractional flows at a particular time step fills up a balloon (e.g., the balloon B1) until the balloon B1 attains a filled condition.

Figure 3B:
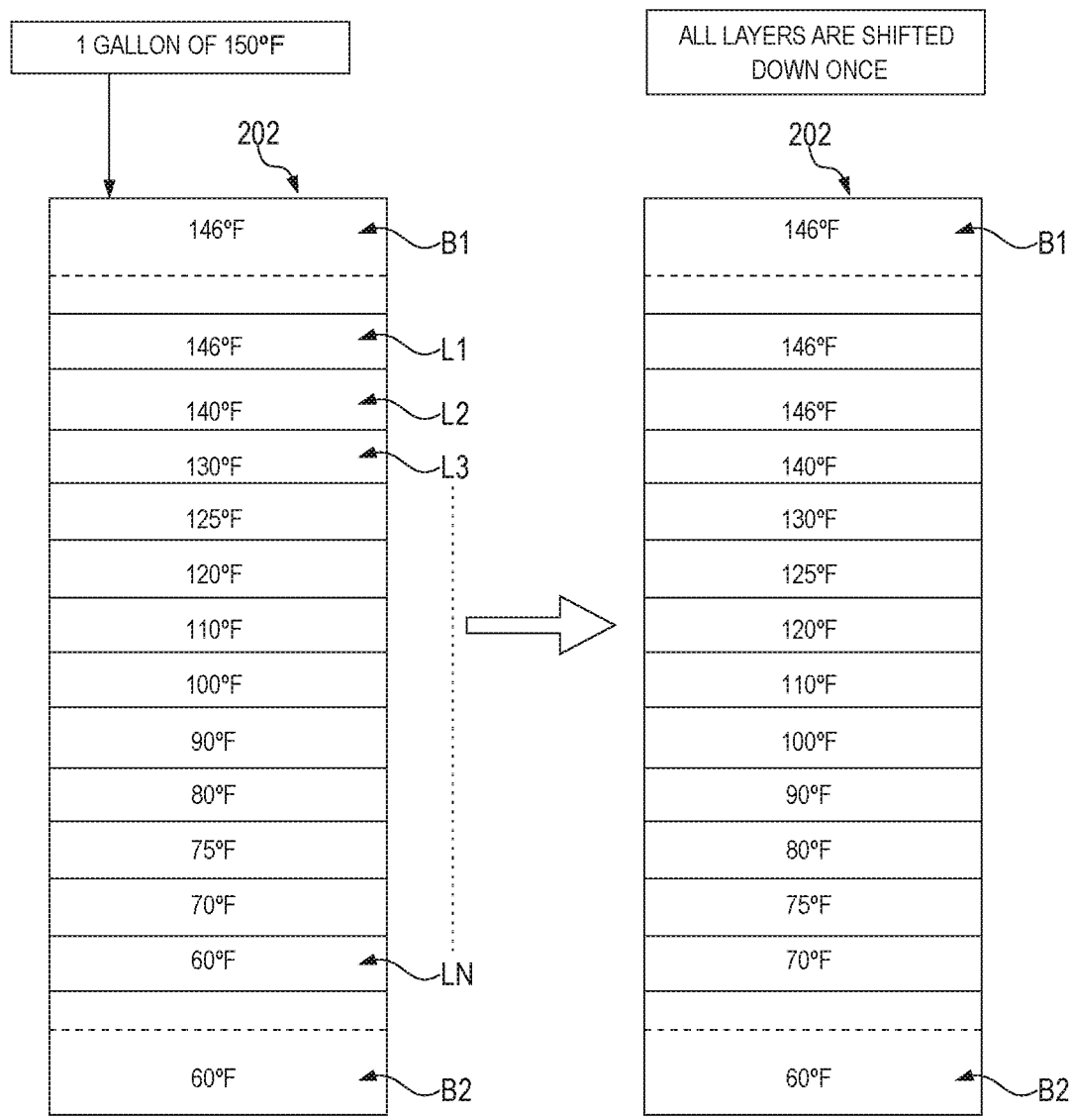

Further, a portion of water stored in the balloon B1 is moved to an adjacent layer (e.g., the constant volume portion L1) when the balloon B1 attains the filled condition and when there is further inflow of water into the tank 202 at the particular time step (as shown in FIG. 3B). As shown in FIG. 3B, one gallon of water at 150 Fahrenheit (° F.) is entering the tank 202. As such, the inflow of water into the tank 202 results the balloon B1 to attain the filled condition, and hence shifts one water layer to the adjacent constant volume portion (e.g., the constant volume portion L1) (as shown in FIG. 3B). Further, all the water layers are shifted simultaneously as explained above (as shown in FIG. 3B). It is to be noted that the movement of water in the tank 202 may be due to water being utilized for domestic hot water or heating use, or to recharge the tank 202 from the heating unit 208.

In one scenario, each balloon B1 and B2 may have a minimum volume for example of 2 gallons and a maximum volume of 2+V_Layer gallons, where V_Layer is the capacity of constant volume portion (e.g., the water layer L1). For example, the volume of the tank 202 may be 83 gallons which can be divided into 78 constant volume portions of 1 gallon and 2 variable volume portions of volume in range of 2 to 3 gallons of uniform known or assumed temperatures. It is evident that the total volume of the 2 variable volume portions is equal to 5 gallons. Thus, when a variable volume portion (e.g., the balloon B1) reaches 3 gallons, 1 gallon of water is pushed upwards or downwards into the adjacent portion, and hence resulting the content of each portion to be moved upwards or downwards throughout the tank 202. The contents of each portion are either moved upwards or downwards in the tank 202 based on the inlet or outlet through which the water enters or exits the tank 202.

It will be apparent for a person skilled in the art that the stratification model (or the layered thermal model) of the tank 202 simulates mass flow through the tank 202 and thermal transfers within and without the tank 202. At each time step (for example, every minute or hour), mass flows are computed by the control unit 220 using the measurements from the set of flowmeters 222 and the set of temperature sensors 218 on each inlet and outlet of the tank 202. Further, the mass flows are propagated through the water layers, and the temperature of each water layer is updated based on thermal transfers which is explained with reference to FIG. 4.

Figure 4A:
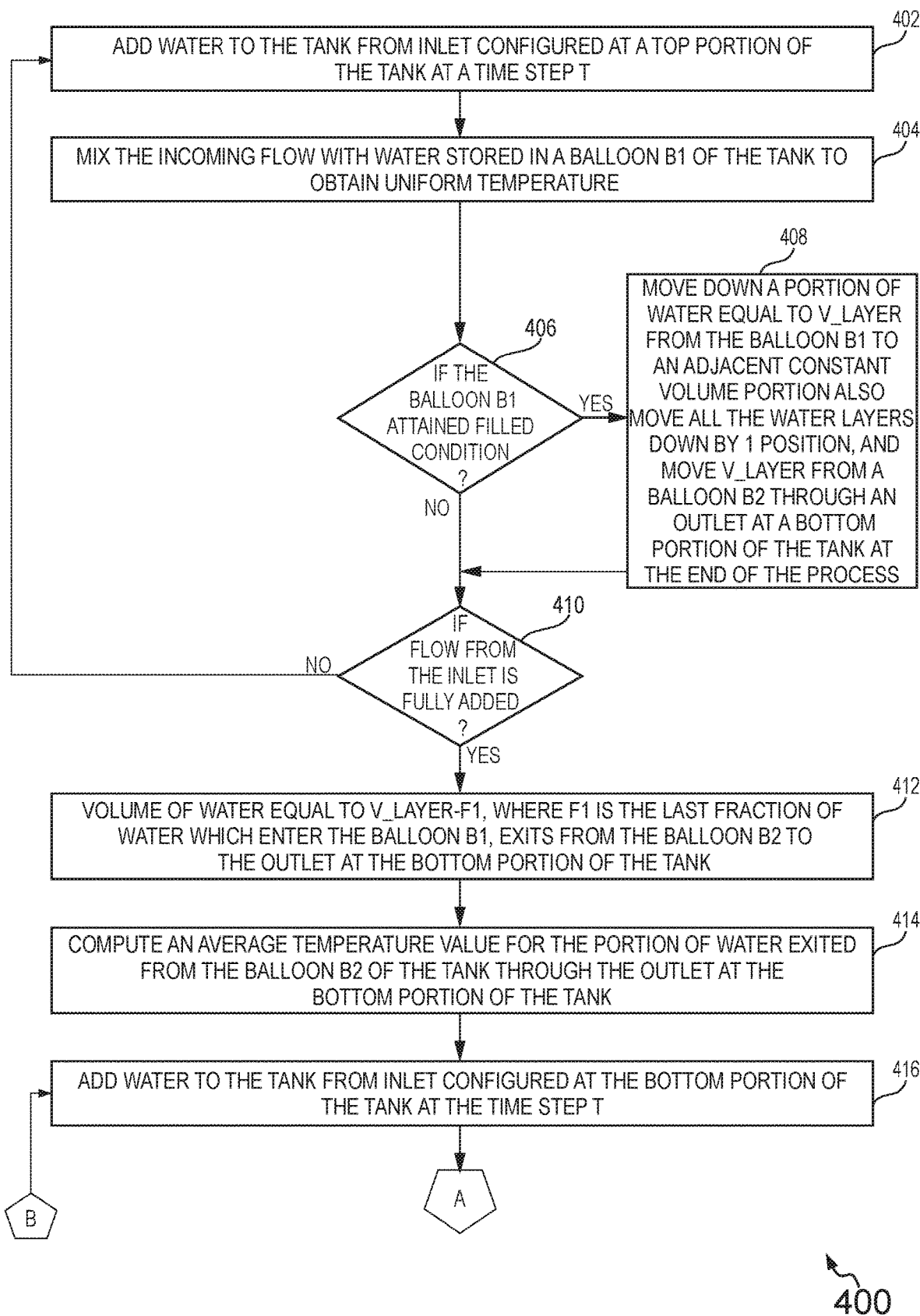
FIGS. 4A and 4B, collectively, represent a flow chart depicting a mass flow process associated with the hydronic system for one time step, in accordance with an embodiment of the present disclosure.
Figure 4B:
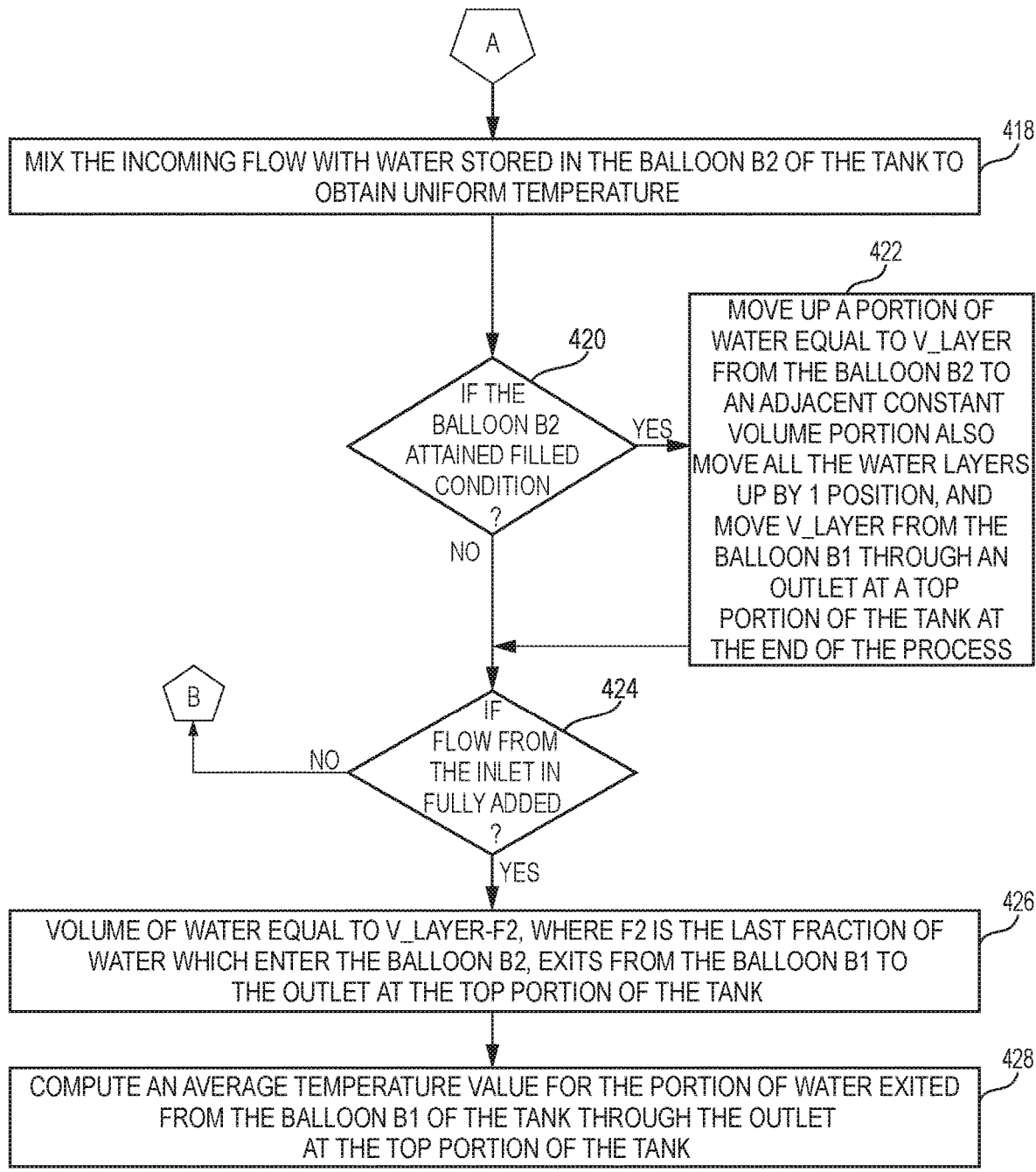

Referring to FIGS. 4A and 4B, a flow chart 400 depicting a mass flow process for one time step is illustrated, in accordance with an embodiment of the present disclosure. The mass flow process is described with reference to the hydronic system 200 as shown in FIG. 2A. Similar to the mass flow process described with reference to FIG. 2A, the mass flow process can also be implemented for the configuration of the hydronic system 200 shown in FIG. 2B. For description purpose, the flow chart 400 is described for one time step (T) in the case where the tank 202 has 'n' inlets configured at the top portion 202a of the tank 202 and 'm' inlets at the bottom portion 202c of the tank 202, and at least one outlet at the top portion 202a and the bottom portion 202c of the tank 202, respectively. In one example scenario, the mass flow process is described with reference to one inlet (e.g., the inlet 202d) and one outlet (e.g., the outlet 202g) at the top portion 202a of the tank 202, and one inlet (e.g., the inlet 202e) and one outlet (e.g., the outlet 202h) at the bottom portion 202c of the tank 202. Further, the steps of the flow chart 400 are performed when the water flows into the tank 202 at one time step T. The sequence of operations of the flow chart 400 may not be necessarily executed in the same order as they are presented. Further, one or more operations may be grouped together and performed in form of a single step, or one operation may have several sub-steps that may be performed in parallel or in a sequential manner.

At 402, water inflows from the inlet (i.e. the inlet 202d) is configured at the top portion 202a of the tank 202 at the time step T. The water entering the tank 202 may be the hot water routed from the heating unit 208. For example, the water entering the tank 202 through the inlet 202d may be heated to about 145 Fahrenheit (° F.). It is evident that the water enters the balloon and/or the variable volume portion B1 located at the top portion 202a of the tank 202 as the water inflow from the inlet 202d.

At 404, the water entering the variable volume portion B1 is allowed to mix with the water already stored in the variable volume portion B1 to obtain a uniform temperature, calculated based on the respective volumes and temperatures of the water entering B1 and the water already in B1.

At 406, the control unit 220 checks if the capacity of the variable volume portion B1 is full as the water flows into the tank 202. In other words, the control unit 220 checks if the variable volume portion B1 has attained the filled condition. In one scenario, if the balloon B1 attains the filled condition, step 408 is performed.

At step 408, a portion of water equal to the capacity of one constant volume portion (V_Layer) and with the uniform temperature calculated in 404, is moved downwards from the balloon B1 to the adjacent portion (i.e. the constant volume portion L1). To that effect, all the water layers stored in the tank 202 are simultaneously moved down by 1 position (i.e. moved down to the adjacent constant volume portions) and a portion of water equal to the capacity of one constant volume portion (V_Layer) exits from the balloon B2 through the outlet 202h. Further, upon rearrangement of the water layers within the tank 202 due to inflow of the water in the tank 202 (as described above by moving all layers down by one position), step 410 is performed.

At 410, the control unit 220 checks if the flow from the inlet 202d is fully added to the tank 202 for the time step T. More specifically, the control unit 220 is configured to monitor the flow rate of the water entering the tank 202 through the inlet 202d via the flowmeter 222a to determine the volume of water entering the tank 202. Based on the volume of water entering the tank 202, the control unit 220 checks if the flow from the inlet 202d is fully added in the tank 202 for the time step T. If the flow from the inlet 202d is determined to be not added completely into the tank 202, the step 402 is performed to add remaining volume of the water into the tank 202. Further, the steps 402 to 410 are repeated several times until the entire volume of water routed from the heating unit 208 is added to the tank 202 through the inlet 202*d* for the time step T. In one scenario, the flow from the inlet 202*d* may fill only a fraction F1 of the balloon B1 (or the balloon B1 may not attain the filled condition). In this scenario, the control unit 220 performs the step 410 to check if the flow from the inlet 202*d* is fully added to the tank 202. In this scenario, a volume of water equal to (V_Layer-F1) exits from the balloon B2 through outlet 202*h*, ensuring that the volume of water in the tank at the end of the process is the same as it was at the start (see, 414). It should be noted that, 'F1' is represented for the fraction of water entering balloon B1, exits from the balloon B2 through the outlet 202*h*.

At 416, an average temperature for the portion of water withdrawn and/or exited from the balloon B2 of the tank 202 through the outlet 202*h* at the time step T is computed. More specifically, the control unit 220 computes the average temperature of the balloon B2 and, if the flow over the time step T exceeded the balloon volume, of each adjacent layer water was drawn from, weighted by the volume withdrawn from each layer.

In one scenario, the tank 202 may be de-stratified due to colder water being added through inlet 202*d*, making the balloon B1 colder than the layer or layers below it. In other words, the tank 202 may be de-stratified, if the temperature of the water entered into the balloon B1 through the inlet 202*d* causes the volume weighted average temperature of balloon to be less than the temperature of the water in the layer or layers below it. In this scenario, the control unit 220 may employ inversion buoyant flow to re-stratify the water layers stored proximate to the top portion 202*a* (i.e. the water stored in the balloon B1 and the constant volume portions located proximate to the top portion 202*a*).

In one implementation, the tank 202 may be configured with multiple inlets at the top portion 202*a* of the tank 202. In this scenario, the steps 402 to 416 are repeated until the inflow from each of the inlets at the top portion 202*a* of the tank 202 is fully processed.

In one implementation at the end of each time step the water layers are re-stratified using the inversion buoyant flow method described below. This is needed if the flow from the inlet caused the water layers and balloon to become de-stratified, e.g. if colder water was added at the top of the tank on top of hotter layers.

In some embodiments of the invention, the thermal profile of the tank 202 may be further determined by incorporating thermal effects into the process.

Similarly, the water may simultaneously enter the tank 202 through the inlet 202*e* at the bottom portion 202*c* of the tank 202. More specifically, at 414, water flows from the inlet (i.e. the inlet 202*e*) configured at the bottom portion 202*c* at the time step T. The water entering the tank 202 may be the cold water routed from the heating unit 208. For example, the water entering the tank 202 through the inlet 202*e* may be cooled to about 60 Fahrenheit (° F.). It is evident that the water enters the balloon and/or the variable volume portion B2 located at the bottom portion 202*c* of the tank 202 as the water flows from the inlet 202*e*. In case of multiple inlets, the water may be added to the balloon B2 through the inlet 202*e* once the inflow from the multiple inlets at the top portion 202*a* is fully processed.

At 418, the water entering the variable volume portion B2 is allowed to mix with the water already stored in the variable volume portion B2 to obtain a uniform temperature.

At 420, the control unit 220 checks if the capacity of the variable volume portion B2 is full as the water inflows into the tank 202. In other words, the control unit 220 checks if the variable volume portion B2 has attained the filled condition. In one scenario, if the balloon B2 attains the filled condition, step 420 is performed.

At step 422, a portion of water equal to the capacity of one constant volume portion (V_Layer) and with the uniform temperature calculated in 418 is moved upwards from the balloon B2 to the adjacent portion. To that effect, all the water layers stored in the tank 202 are simultaneously moved upwards by 1 position (i.e. moved upwards to the adjacent constant volume portions) and a portion of water equal to the capacity of one constant volume portion (V_Layer) exits from the balloon B1 through the outlet 202*g*. Further, upon rearrangement of the water layers within the tank 202 due to inflow of the water in the tank 202 (as described above by moving all layers down by one position), step 424 is performed.

At 424, the control unit 220 checks if the flow from the inlet 202*e* is fully added to the tank 202 for the time step T. More specifically, the control unit 220 is configured to monitor the flow rate of the water entering the tank 202 through the inlet 202*e* via the flowmeter 222*b* to determine the volume of water entering the tank 202. Based on the volume of water entering the tank 202, the control unit 220 checks if the flow from the inlet 202*e* is fully added in the tank 202 for the time step T. If the flow from the inlet 202*e* is determined to be not added completely into the tank 202, the step 414 is repeated to add remaining volume of the water into the tank 202. Further, the steps 416 to 424 are repeated several times until the entire volume of water routed from the heating unit 208 is added to the tank 202 through the inlet 202*e* for the time step T. In one scenario, the flow from the inlet 202*e* may fill only a fraction of the balloon B2 (or the balloon B2 may not attain the filled condition). In this scenario, the control unit 220 performs the step 424 to check if the flow from the inlet 202*e* is fully added to the tank 202. In this scenario, a volume of water equal to (V_Layer-F2) exits from the balloon B1 through outlet 202*g*, ensuring that the volume of water in the tank at the end of the process is the same as it was at the start (see, 426). It should be noted that, 'F2' is represented as the fraction of water entering balloon B2, exits from the balloon B1 through the outlet 202*g*.

At 428, an average temperature for the portion of water withdrawn and/or exited from the balloon B1 of the tank 202 through the outlet 202*g* at the time step T is computed. More specifically, the control unit 220 computes the average temperature of the balloon B1 and, if the flow over the time step T exceeded the capacity of the balloon B2, of each adjacent layer water was drawn from, weighted by the volume withdrawn from each layer.

In one scenario, the tank 202 may be de-stratified due to warmer water being added through the inlet 202*e* making the water stored in the balloon B2 warmer than the layer or layers above it. In other words, the tank 202 may be de-stratified, if the temperature of the water entered into the balloon B2 through inlet 202*e* causes the volume weighted average temperature of the balloon to be greater than the temperature of the water in the layer or layers above it. In this scenario, the control unit 220 may employ inversion buoyant flow to re-stratify the water layers stored proximate to the bottom portion 202*c* (i.e. the water stored in the balloon B2 and the constant volume portions located proximate to the bottom portion 202*c*).

In one implementation, the tank 202 may be configured with multiple inlets at the bottom portion 202*c*. In this scenario, the steps 414 to 424 are repeated until the inflow from each of the inlets at the bottom portion 202*c* of the tank 202 is fully processed. In one example scenario, the water may enter the tank 202 only through the inlets at the top portion 202a or only through the inlets at the bottom portion 202c. Hence, the steps 402 to 412 and the steps 416 to 428 are performed based at least on the inlets at the top portion 202a and the bottom portion 202c, respectively.

Referring back to FIG. 2A, additionally, the temperature profile determined at each time step for the tank 202 depends on at least one parameter related to thermal effects. In other words, the temperature profile of the tank 202 is altered based at least on the parameters related to thermal effects. The parameters related to thermal effects may include, but not limited to, thermal loss associated with the thermal storage tank 202, thermal transfers between each consecutive water layer of the plurality of water layers, loss buoyant flow and inversion buoyant flow.

More specifically, the thermal loss associated with the tank 202 corresponds to the losses to the environment through outer surfaces (i.e. side, top and bottom surfaces) of the tank 202. At each time step, the heat is lost through the wall of the tank due to temperature difference between the ambient air outside the tank 202 and the temperature of the water layers stored in the tank 202. The control unit 220 may be configured to determine the temperature difference due to thermal loss associated with the tank 202 and adjusts the temperature of each layer accordingly. The thermal loss to the environment through the walls of the tank 202 may be computed by using the following equation:

$$\text{Thermal loss}, Q(J/s) = A \times (T\_L - T\_air)/(L\_wall/k\_wall) \quad \text{(Eqn. 1)}$$

Wherein,
- A = area of layer wall (m$^2$),
- T_L = temperature of water in layer L (K),
- T_air = temperature of ambient air (K),
- L_wall = width of tank wall insulation (m), and
- k_wall = thermal conductivity of tank wall insulation (J/(m·s·K)).

Further, thermal transfers between two adjacent layers at different temperatures at each time step are due to the temperature difference between the water layers stored in the tank 202. More specifically, the heat moves between layers i.e. from hotter water layers to colder water layers located adjacent to the hotter water layers. The control unit 220 is configured to compute the thermal transfers (or the heat exchanged) between two adjacent layers based on the following equation:

$$\text{Thermal transfer}, Q = A \times (Tn - Tn+1)/L\_L/Qcd\_\text{water (average}(Tn, Tn+1)) \quad \text{(Eqn. 2)}$$

Wherein,
- Tn = temperature of layer n (K),
- L_L = thickness of one layer (m), and
- Qcd_water = thermal conductivity of water at temperature T (J/(m·s·K)).

It should be noted that the process for determining the thermal transfer at each time step is iteratively performed for all the water layers from the top portion 202a to the bottom portion 202c of the tank 202.

As explained above, the inversion buoyant flow is utilized to stratify the tank 202. In one case, cold water may be introduced above the hotter water layers stored in the tank 202. In this case, the cold water is mixed up with the hotter water layers by averaging the temperature of the cold water and hot water weighted by the volume of each layer. This results in obtaining uniform temperature (i.e. the top two water layers having the same temperature) in the tank 202. In general, while layer n+1 is warmer and/or hotter than the top n layers (which are at the same temperature), the layer n+1 and the top n layers are mixed to obtain uniform temperature for the top n+1 layers in the tank. Further, the process of inversion buoyant flow is repeated until the tank 202 is stratified.

Moreover, the inversion buoyant flow may be utilized in the case where the hot water is introduced at the bottom portion 202c of the tank 202 below cold water layers, or when water is introduced on a side port located anywhere between the top portion 202a and the bottom portion 202c of the tank 202 (not shown in figures).

The loss buoyant flow is computed when the film of water along the walls of the tank 202 exhibits a faster cooling rate than the inner core of the tank 202. As such, the cooler film falls, which results the core to rise and creates a convection cell throughout the tank 202. Further, at each time step, the upward flow of heat due to loss buoyant flow is computed using the following equation:

$$\text{Loss buoyant flow}, Qb(n) = 0.25 \times ((T(n+1) - T(n))/L\_L)^\wedge - 0.6 \times (Q\_env(n+1) + Q\_\text{buoyant}(n+1)) \quad \text{(Eqn. 3)}$$

Wherein,
- Qb(n) = thermal flow from layer n−1 to layer n, and
- Qenv(n) = thermal loss to the environment for layer n per section.

As such, the control unit 220 is configured to determine the parameters related to thermal effects associated with the tank 202 at every time step, which can be cumulated for updating the temperature of each water layer in the tank 202 accordingly. In other words, the temperature profile of the tank 202 at each time step is updated based at least on determining the parameters related to thermal effects associated with the tank 202. In one embodiment, the measured temperature and/or the temperature profile may be adjusted based on the thermal transfer such as conduction, convection and/or radiation.

Further, the control unit 220 is configured to calculate the time required for operating the heating unit 208 for heating the water from the outlet 202h. In particular, the control unit 220 with access to the temperature profile data of the tank 202 determined over a period of time, calculates the time required for operating the heating unit 208 to heat the water from the tank 202. Further, the time for operating the heating unit 208 to heat the water is based on the user requirements that is communicated to the control unit 220 as explained above. It is noted that, the capacity or operating time of the heating unit 208 varies based on the calculated temperature profile of the tank 202 and the requirement of the hot water by the user 102. Further, accurate knowledge of the temperature profile of the tank 202 may provide information on the amount of hot water that can be delivered to a household over the next day. As such, if the amount of hot water is determined to be lower than the required amount, the control unit 220, with access to the temperature profile of the water stored in the tank 202, may determine the time required by the heating unit 208 for recharging the hot water in the tank 202 and initiate its operation.

In an embodiment, the water in the tank may be cooled down, either due to water being in the tank for a long time resulting in loss of heat through thermal losses or due to mixing up with cold water coming in from the utility. In this scenario, the water may be routed to the heating unit 208 for reheating. Thus, there may be a wastage of energy in heating the water due to inefficiency in the prediction of the temperature of the water. As a result, determining the temperature profile of the water throughout the tank 202, helps in minimizing the wastage of energy, if the temperature of water in the tank 202 would otherwise be underestimated. Conversely, the temperature profile of the tank 202 helps in minimizing performance issues where the user 102 does not receive the hot water as per the requirements, if the temperature of the water in the tank 202 would otherwise be overestimated. More particularly, the operating time of the heating unit 208 for recharging the heat content in the tank 202 is determined based at least on the temperature profile of the tank 202 as explained above. As a result, normal regulation of the amount of hot water at a sufficient temperature to meet the requirements of the user 102 by the tank 202 may be improved based on the temperature profile of the tank 202. The computation of the flow rate and the temperature of water being entered or exited from the tank 202, current location of the water layers in the tank 202, operating time of the heating unit 208, and thermal loss are collectively utilized for thermal profiling of the tank 202.

Additionally, the control unit 220 may operate the heating 208 based at least on the operation cycle. The operation cycle being at least the on-peak operation cycle and the off-peak operation cycle. In one implementation, the on-peak operation cycle may be the time period in which the demand for use of the system 200 will be the highest. As an example, the time period between 6 am to 9 am and 6 pm to 9 pm of a day when the user 102 is engaged in daily activities, may be considered as the on-peak operation cycle. In another implementation, the on-peak operation cycle may be the time at which the cost of energy is highest. As an example, the time period between 5 pm and 9 pm, may be the time at which the cost of energy is highest. The on-peak operation cycle may also be based on the load acting or the demand for the hot water and/or cold water for the enclosure 212. Further, the off-peak operation cycle may be the remainder time period of the day. In one implementation, the off-peak operation cycle corresponds to load shifting i.e. generation of heat at a time separate from its delivery. In case of the on-peak operation cycle, the control unit 220 with access to the temperature profile of the tank 202 computes the operating time of the heating unit 208 and instantaneously operates the heating unit 208 for recharging the hot water or cold water within the thermal storage tank 202. In case of off-peak operation cycle, the control unit 220 operates the heating unit 208 selectively based at least on costs, emissions and a schedule of operation of a power source for recharging the hot water or cold water in the tank 202. The cost and the schedule of operation of the power source are defined in the look-up table configured in the database 116 communicably coupled to the control unit 220. It is evident that the temperature profile of the tank 202 optimizes load shifting conditions in addition to minimizing atmospheric carbon generation and/or emissions, operating cost, and the like.

In one embodiment, a server system (for example the server system 108 shown in FIG. 1) is configured to monitor a volume of water entering within or exiting from the tank 202. The server system 108 is also configured to monitor the temperature of the volume of water at a location over time. Further, the server system 108 may monitor the temperature of water layers at various locations of the tank 202 based on the flow rate and the temperature measurements as the volume of water enters or exits the tank 202. Thereafter, the server system 108 may utilize the temperature data of the water layers at various locations in the tank 202 for generating the temperature profile of the tank 202. Additionally, the server system 108 is configured to calculate a time period required for operating the heating unit 208 for recharging the heat content in the tank 202 based on the temperature profile of the tank 202.

Referring to FIG. 5, a table 500 depicting the temperature profile of the tank 202 at specific times after the initial condition, for example at hourly intervals, following a range of inflow, outflow and waiting events, in accordance with an embodiment of the present disclosure. In the illustrated example, initially, the tank 202 is completely filled with water at time step T0 with water layers with a known or assumed range of temperatures. The range of temperatures of the water layers stored in the tank 202 at the time step T0 is exemplarily depicted to be 145° F. to 60° F. (see, column 502 of FIG. 5). Each column Over a series of time, various events occur, resulting in a change in the temperature profile of the tank. Over time step T1 (i.e. between the time steps T0 to T1), the temperature profile after the inflow of hot water into the top of the tank over a certain period of time is shown (see, column 504 of FIG. 5). Over time step T2 (i.e. between the time steps T1 to T2), the temperature profile after the same inflow lasts a longer period of time is shown (see, column 506 of FIG. 5). Over time step T3 (i.e. between the time steps T2 to T3), the temperature profile after some time without inflow or outflow highlighting the results of thermal decay and temperature homogenization is shown (see, column 508 of FIG. 5). Over time step T4 (i.e. between the time steps T3 to T4), the temperature upon start of an inflow of cold water into the tank is shown (see, column 510 of FIG. 5). Over time step T5 (i.e. between the time steps T4 to T5), the temperature profile after sustained inflow of cold water into the tank and with hot water starting to enter the top of the tank is shown (see, column 512 of FIG. 5).

Thereafter, the volume of water entering the tank 202 is allowed to mix up with the water already stored in the tank 202 to obtain uniform temperature. The amount of mixing depends on parameters such as the flow rate, temperature differentials, geometry of the tank 202 and the like. For instance, the temperature measurements are exemplarily depicted to be in the range of 144.9° F. to 142° F., upon mixing the volume of water with the water stored in the tank 202 (see, column 504 of FIG. 5). As explained with reference to FIGS. 4A and 4B, the water stored in the form of layers in the tank 202 may be displaced from the original position (i.e. shifted downwards) from the balloon B1 to adjacent constant volume portion based on the volume of water inflow and outflow into/from the tank 202.

The control unit 220 is configured to determine the current location of each of the water layers in the tank 202 based on dimensions (or structural configuration) of the tank 202 and monitoring the flow rate of the water entering and exiting the tank 202 from the inlet 202d and the outlet 202h, respectively. The control unit 220 may monitor the flow rate of the water entering and exiting the tank 202 over the time step T1 via the flowmeters 222a and 222c mounted at the inlet 202d and the outlet 202h, respectively. Further, the control unit 220 may monitor the temperature measurement of the volume of water entering and exiting the tank 202 over the time step T1 via the temperature sensors 218a and 218c. The temperature measurements of the volume of water entering and exiting the tank 202 provide information of the temperature value of the water layers at various locations in the tank 202. Additionally, the control unit 220 computes the average temperature value of the water withdrawn from the tank 202 through the outlet 202h over the time step T1. Thereafter, the control unit 220 is configured to electronically generate the temperature profile of the tank 202 for the time step T1 based at least on the current location of the water layers, the flow rate and the temperature measurements of the water, and the average temperature value at the end of the time step T1. In other words, the layered thermal model allows a representation of the temperature of the fluid (i.e. water) at all points in the tank 202 when the water enters or exits the tank 202 at each time step.

Over the time step T2, additional volume of water of temperature 145° F. may enter the tank 202 which disrupts the temperature profile of the tank 202 (see, column 506 of FIG. 5). It should be noted that the water layers of temperature 60° F. are forced out from the tank 202 through the outlet 202h as the water flows into the tank 202 at over time step T2 (see, column 506 of FIG. 5). Thus, it is evident that the temperature profile of the tank 202 varies over the period of time based on the inflow and outflow of water into/from the tank 202. As shown, a column 508 is depicted to include the temperature profile of the tank 202 over time step T3 when there is no inflow or outflow of water into/from the tank 202.

Further, over the time step T4 a volume of water (e.g., the cold water) of temperature 60° F. may enter the balloon B2 of the tank 202 from the inlet 202e (see, column 510 of FIG. 5). Thereafter, the volume of water entering the tank 202 is allowed to mix up with the water already stored in the tank 202 to obtain uniform temperature. The temperature measurements are exemplarily depicted to be in the range of 84.1° F. to 143.4° F., upon mixing the volume of water with the water stored in the tank 202. As explained with reference to FIGS. 4A and 4B, the water stored in form of layers may be displaced from the original position (i.e. shifted upwards) based on the volume of water inflow and outflow into/from the tank 202.

The control unit 220 is configured to determine the current location of each of the water layers in the tank 202 based on dimensions (or structural configuration) of the tank 202 and monitor the flow rate of the water entering and exiting the tank 202 from the inlet 202e and the outlet 202g, respectively. The control unit 220 may monitor the flow rate of the water entering the tank 202 over the time step T4 via the flowmeters 222b mounted at the inlet 202e. Further, the control unit 220 may monitor the temperature measurement of the volume of water entering and exiting the tank 202 over the time step T4 via the temperature sensors 218a and 218c. The temperature measurements of the volume of water entering and exiting the tank 202 provide information of the temperature value of the water layers at various locations in the tank 202. Additionally, the control unit 220 computes the average temperature value of the water withdrawn from the tank 202 through the outlet 202g over the time step T4 based at least on the data from the temperature sensor 218b. Thereafter, the control unit 220 is configured to electronically generate the temperature profile of the tank 202 for the time step T4 based at least on the current location of the water layers, the flow rate and the temperature measurements of the water, and the average temperature value.

Further over the time step T5, a volume of water (i.e. hot water and cold water) may simultaneously enter the tank 202 (see, column 512 of FIG. 5). As such, the control unit 220 is configured to generate the temperature profile at each time step (i.e. the time steps T2, T3, and T5) as explained above, and therefore they are not reiterated herein for the sake of brevity. Similarly, the temperature profile of the tank 202 at a series of time step (i.e. the time steps T0-T5) facilitates the control unit 220 to generate the temperature profile as a function of time (time-dependent temperature profile) for the tank 202.

Figure 6:
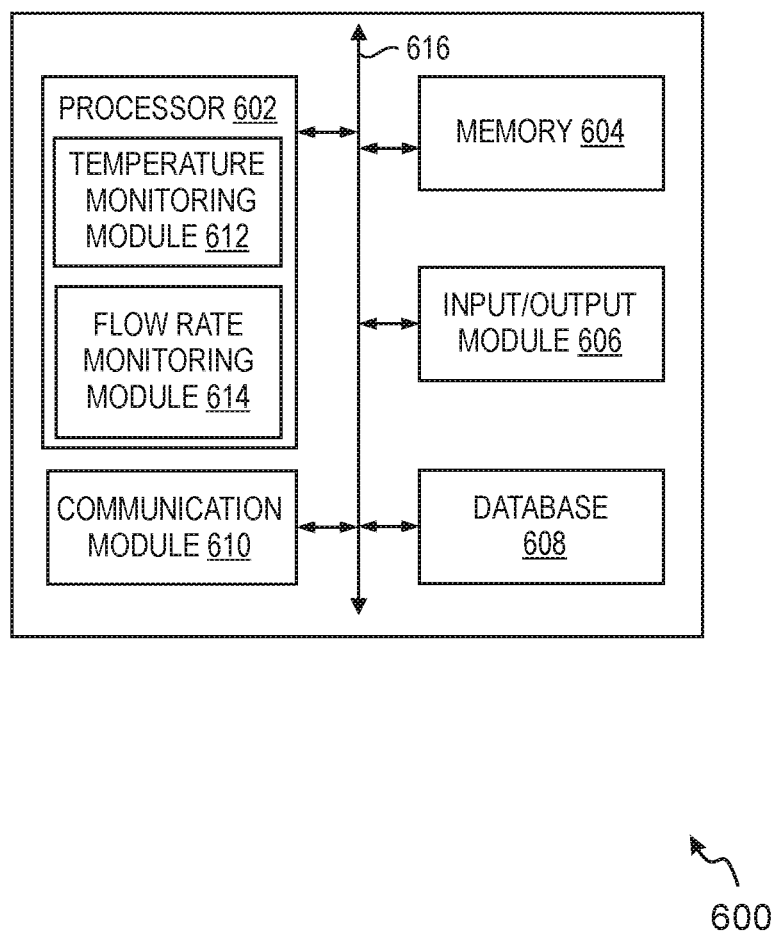
FIG. 6 is a block diagram representation of a control unit of the hydronic system of FIGS. 2A and 2B, in accordance with an embodiment of the present disclosure.

FIG. 6 is a block diagram representation 600 of the control unit 220 (shown in FIG. 2) configured for operating the hydronic system 200, in accordance with an example embodiment of the present disclosure. The control unit 220 includes various processing modules for operating the hydronic system 200. The processing modules described herein may be implemented by a combination of hardware, software and firmware components.

The control unit 220 includes a processor 602, a memory 604, an input/output module 606 (hereinafter referred to as "I/O module 606"), and a database 608. The processor 602 includes a temperature monitoring module 612 and a flow rate monitoring module 614. It is noted that although the control unit 220 is depicted to include only one processor 602, the control unit 220 may include more number of processors therein. Moreover, it shall be noted that the components are shown for exemplary purposes and the control unit 220 may include fewer or additional modules than those depicted in FIG. 6.

In an embodiment, the memory 604 is capable of storing machine-executable instructions. Further, the processor 602 is capable of executing the machine-executable instructions to perform the functions described herein. In an embodiment, the processor 602 may be embodied as a multi-core processor, a single-core processor, or a combination of one or more multi-core processors and one or more single-core processors. For example, the processor 602 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. In an embodiment, the processor 602 may be configured to execute hard-coded functionality. In an embodiment, the processor 602 is embodied as an executor of software instructions, wherein the instructions may specifically configure the processor 602 to perform the algorithms and/or operations described herein when the instructions are executed.

The memory 604 may be embodied as one or more volatile memory devices, one or more non-volatile memory devices, and/or a combination of one or more volatile memory devices and non-volatile memory devices. For example, the memory 604 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In an embodiment, the I/O module 606 may include mechanisms and/or circuitry configured to receive the input information from the user 102 for operating the hydronic system 200 and also provide output to the user 102 via the application 114. For example, the I/O module 606 is configured to receive the user inputs from the user 102 related to temperature requirements for conditioning the enclosure 212, volume and temperature of the hot or cold water, price of electricity (at different times such as, off-peak operation cycle and on-peak operation cycle), and the like. In one embodiment, the I/O module 606 may be configured to communicate with a temperature sensing device (i.e. the thermostat 226) for receiving inputs related to the temperature of the surrounding environment (or the enclosure 212). To that effect, the input/output module 606 may include at least one interface and/or at least one output interface.

Additionally, the control unit 112 includes the database 608 configured to store at least the input information provided by the user 102, the look-up-table including information related to the on-peak and off-peak operation cycles, the temperature profile data of the tank 202 at each time step, and the like. The database 608 may also be configured to store information exchanged or generated during each step of the analysis by the processor 602, for operating the hydronic system 200. The database 608 may also be configured to maintain log of the data processed by each of the modules (such as the temperature monitoring module 612 and the flow rate monitoring module 614) within the processor 602. The log allows the user 102 to track and understand the analysis performed by the processor 602.

In an embodiment, the processor 602 includes a temperature monitoring module 612 and a flow rate monitoring module 614. The various modules of the control unit 220, such as the processor 602, the memory 604, the I/O module 606, the database 608, the temperature monitoring module 612 and the flow rate monitoring module 614 may be configured to communicate with each other through a centralized circuit system 616. The centralized circuit system 616 may be various devices configured to, among other things, provide or enable communication between the components (602 to 614) of the control unit 220. In certain embodiments, the centralized circuit system 616 may be software-based, a central printed circuit board (PCB) such as a motherboard, a main board, a system board, or a logic board. The centralized circuit system 616 may also, or alternatively, include other printed circuit assemblies (PCAs) or communication channel media. The control unit 220 may be configured to communicate with the thermostat, the user device 104, the server system 108 or with any entity of FIG. 1 via a communication module 610.

The temperature monitoring module 612 is communicably coupled to the set of temperature sensors (as shown in FIGS. 2A and 2B). The temperature monitoring module 612 is configured to monitor the temperature of the water when the water is entering and exiting the tank 202 at each time step. More specifically, the module 612 monitors the temperature of the water (hot water or cold water) measured by a set of temperature sensors, either continuously or when the water is entering and exiting the tank during each time step. The temperatures measured by the temperature sensor at each time step (e.g., the time steps T0-T5) are utilized by the processor 602 to progressively build up a temperature map or the temperature profile of the tank 202. Further, the temperature monitoring module 612 is configured to monitor the variation of the temperature of the water layers (or the variation of the temperature profile) for over a period of time. Moreover, the temperature monitoring module 612 enables to ascertain the thermal losses associated with the ambient temperature while the water is in the tank 202, and during flow of water in the conduits. This allows the hydronic system 200 to compensate for the thermal losses by operating the heating unit 208 for maintaining the water within the tank 202 at the desired temperatures. In one implementation, the temperature monitoring module 612 may determine the operating temperatures of the hot water or the cold water, based on the operation cycles.

The flow rate monitoring module 614 is communicably coupled to the set of temperature sensors (as shown in FIGS. 2A and 2B) to monitor the flow rate of the water when entering and exiting the tank 202. In particular, the flow rate monitoring module 614 is configured to monitor the flow rate associated with the hot water or the cold water during inflow or outflow within/from the tank 202 at each time step (e.g., the time steps T0-T5). The flow rate associated with the water entering the tank 202 allows the processor 602 to determine a current location of the water layers in the tank 202 as explained above. As such, the processor 602 is configured to determine the temperature profile of the tank 202 based on the flow rate and the temperature data associated with water, and the current location of the water layers in the tank 202 (layered thermal model) as explained above. The one or more steps and/or operations performed by the control unit 220 are explained above, and therefore they are not re-iterated, for the sake of brevity.

Figure 7:
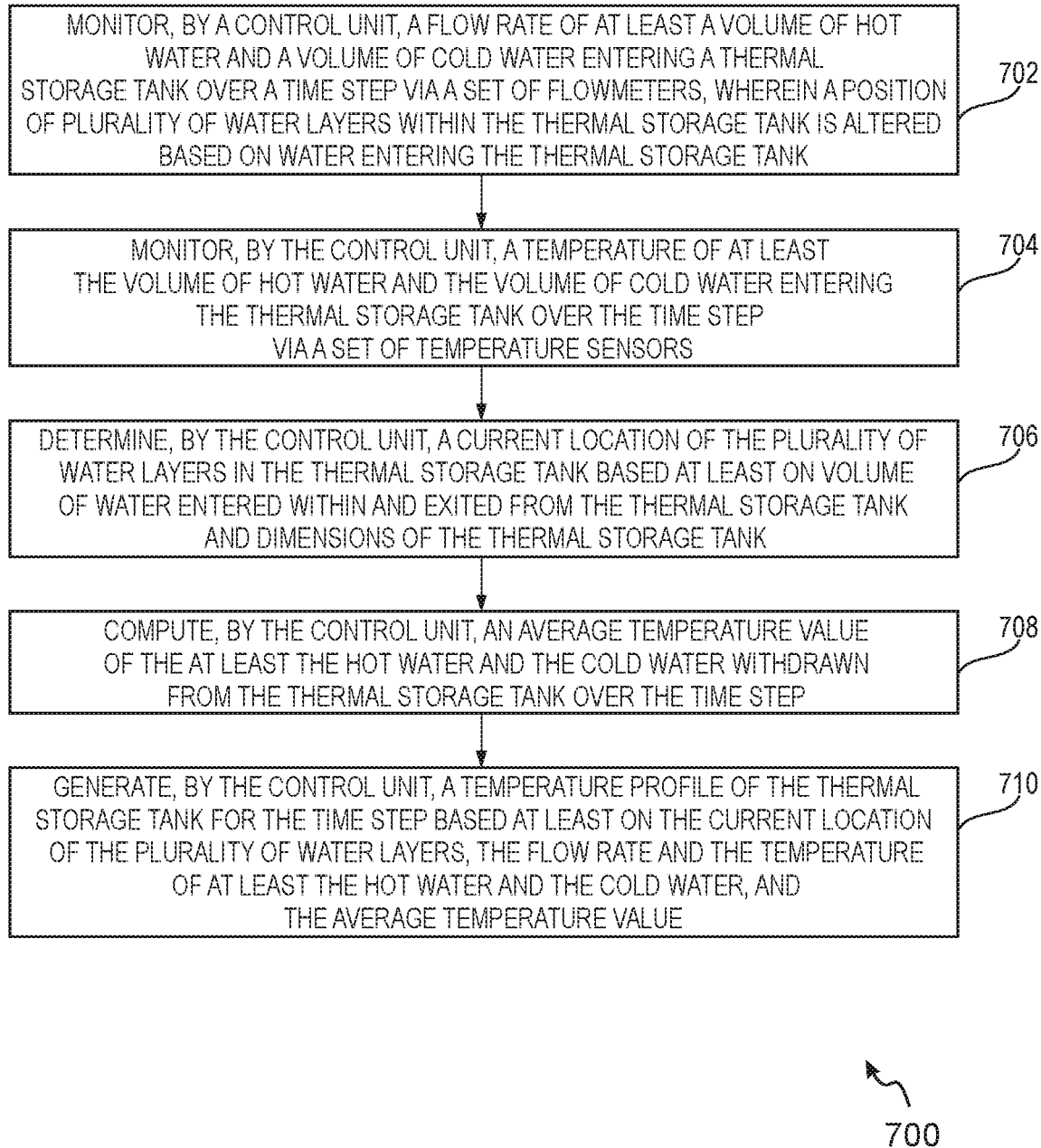
FIG. 7 illustrates a flow diagram for a method for determining the temperature profile associated with the thermal storage tank of the hydronic system, in accordance with an embodiment of the present disclosure.

FIG. 7 illustrates a flow diagram for a method 700 for determining the temperature profile of the thermal storage tank 202 of the hydronic system 200, in accordance with an embodiment of the present disclosure. The method 700 depicted in the flow diagram may be executed by a control unit (e.g., the control unit 220) or a server system (e.g., the server system 108). Operations of the method 700 and combinations of operation in the flow diagram, may be implemented by, for example, hardware, firmware, a processor, circuitry and/or a different device associated with the execution of software that includes one or more computed program instructions. The method 700 starts at operation 702.

At operation 702, the method 700 includes monitoring, by the control unit 220, a flow rate of at least a volume of hot water and a volume of cold water entering the thermal storage tank 202 over a time step via a set of flowmeters 222. The position of plurality of water layers within the thermal storage tank 202 is altered based on water entering the thermal storage tank 202.

At operation 704, the method 700 includes monitoring, by the control unit 220, a temperature of at least the volume of hot water and the volume of cold water entering the thermal storage tank 202 over the time step via the set of temperature sensors 218.

At operation 706, the method 700 includes determining, by the control unit 220, a current location of the plurality of water layers in the thermal storage tank 202 based at least on the volume of water entered within and exited from the thermal storage tank 202 and dimensions of the thermal storage tank 202.

At operation 708, the method 700 includes computing, by the control unit 220, an average temperature value of the at least the hot water and the cold water withdrawn from the thermal storage tank 202 over the time step.

At operation 710, the method 700 includes generating, by the control unit 220, a temperature profile of the thermal storage tank 202 for the time step based at least on the current location of the plurality of water layers, the flow rate and the temperature of at least the hot water and the cold water, and the average temperature value.

Additionally, the control unit 220 is configured to monitor the temperature and the flow rate of the hot water or the cold water entering and exiting the tank 202 at a series of time step (or for over a period of time). The control unit 220 generates the temperature profile as a function of time for the tank 202 based at least on a current location of each water layer of the plurality of water layers in the tank 202, the flow rate and the temperature of the hot water and the cold water at each time step and the average temperature value measured at each time step. The control unit 220 determines the current location of each water layer of the plurality of water layers in the tank 202 when a portion of water stored in a variable volume portion of the pair of variable volume portions is moved to a constant volume portion located adjacent to the variable volume portion. It is to be noted that the portion of water in the variable volume portion is moved to the constant volume portion when the variable volume portion attains a filled condition.

Further, the control unit 220 is configured to determine at least one parameter related to thermal effects associated with the tank 202 at each time step. Thereafter, the temperature profile of the tank 202 is updated (or altered) based at least on the at least one parameter related to thermal effects. Furthermore, the control unit 220 is configured to operate the heating unit 208 based at least on the temperature profile of the thermal storage tank 202, the operating time and an operation cycle, the operation cycle being at least an on-peak operation cycle and an off-peak operation cycle. In one case, the control unit 220 operates the heating unit 208 instantaneously for recharging the hot water or cold water within the thermal storage tank 202 in the on-peak operation cycle. In another case, the control unit 220 operates the heating unit 208 selectively based at least on costs, emissions and a schedule of operation of a power source for recharging the hot water or cold water in the off-peak operation cycle. The cost and the schedule of operation of the power source may be defined in the look-up table configured in a database (e.g., the database 608) communicably coupled to the control unit 220. The description pertaining to the operations performed by the control unit 220 is explained with references to FIGS. 2A to 6, and is not reiterated herein for the sake of brevity.

Figure 8:
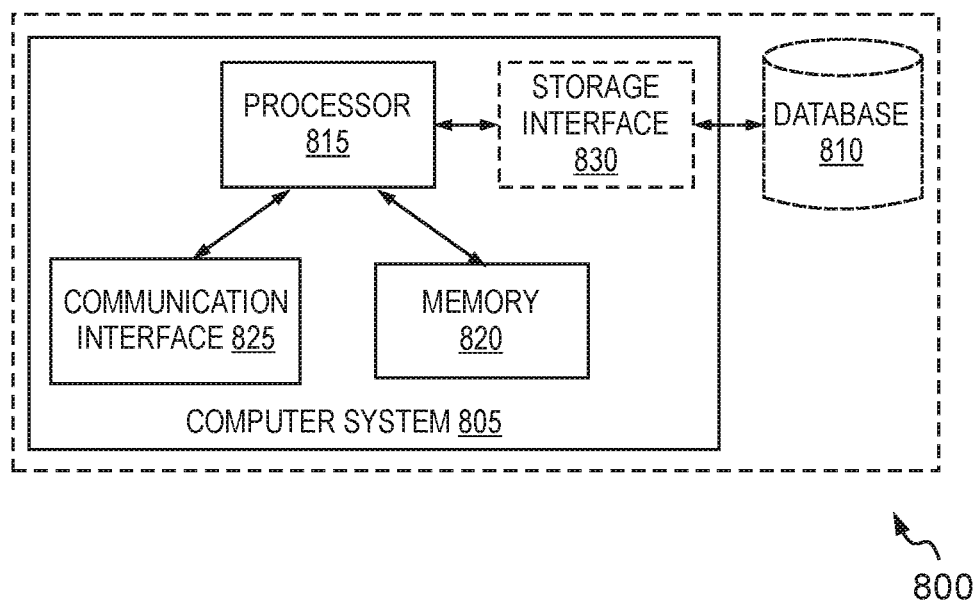
FIG. 8 is a block diagram of a server capable of implementing at least some embodiments of the present disclosure.

FIG. 8 illustrates a block diagram representation of a server system 800 capable of implementing at least some embodiments of the present disclosure. The server system 800 is configured to host and manage the application 114 that is provided to an electronic device such as the user device 104. An example of the server system 800 is the server system 108 shown and described with reference to FIG. 1. The server system 800 includes a computer system 805 and a database 810.

The computer system 805 includes at least one processor 815 for executing instructions. Instructions may be stored in, for example, but not limited to, a memory 820. The processor 815 may include one or more processing units (e.g., in a multi-core configuration). The memory 820 is a storage device embodied as one or more volatile memory devices, one or more non-volatile memory devices, and/or a combination of one or more volatile memory devices and non-volatile memory devices, for storing micro-contents information and instructions. The memory 820 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The processor 815 is operatively coupled to a communication interface 825 such that the computer system 805 is capable of communicating with a mobile device, for example, the user device 104 or communicates with any entity within the network 106 via the communication interface 825.

The processor 815 may also be operatively coupled to the database 810. The database 810 is any computer-operated hardware suitable for storing and/or retrieving data, such as, but not limited to, the input information, the temperature data, the load data, data obtained during operation of the system 200, the temperature profile associated with the system 200 and the like. The database 810 may include multiple storage units such as hard disks and/or solid-state disks in a redundant array of inexpensive disks (RAID) configuration. The database 810 may include a storage area network (SAN) and/or a network attached storage (NAS) system.

In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The processor 815 is communicably coupled with the memory 820 and the communication interface 825. The processor 815 is capable of executing the stored machine executable instructions in the memory 820 or within the processor 815 or any storage location accessible to the processor 815. The processor 815 may be embodied in a number of different ways. In an example embodiment, the processor 815 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 815 performs various functionalities of the server system 800 as described herein.

The disclosed methods with reference to FIGS. 1 to 7, or one or more operations of the flow diagrams 400 and 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:
   a thermal storage tank comprising one or more inlets and one or more outlets, the thermal storage tank configured to store at least hot water and cold water in the form of a plurality of water layers, the plurality of water layers comprising multiple fixed volume portions stacked between a pair of variable volume portions;
   a set of temperature sensors mounted at the one or more inlets and the one or more outlets of the thermal storage tank;
   a set of flowmeters mounted at the one or more inlets and the one or more outlets of the thermal storage tank; and
   a control unit communicably coupled to the set of flowmeters and the set of temperature sensors, the control unit configured to at least:
      monitor a respective flow rate of each of at least a volume of hot water and a volume of cold water entering the thermal storage tank over a time step via the set of flowmeters, wherein a respective current location of each position of the plurality of water layers within the thermal storage tank is altered based on at least the volume of hot water and the volume of cold water entering the thermal storage tank,
      monitor a respective temperature of at least the volume of hot water and the volume of cold water entering the thermal storage tank over the time step via the set of temperature sensors,
      determine a respective current location of each of the plurality of water layers in the thermal storage tank based at least on the volume of hot water and the volume of cold water entered within and exited from the thermal storage tank and dimensions of the thermal storage tank,
      compute an average temperature value of the at least the hot water and the cold water exited from the thermal storage tank over the time step, and
      electronically generate a temperature profile of the thermal storage tank for the time step based at least on the respective current location of each of the plurality of water layers, the flow rate and the respective temperature of each of at least the hot water and the cold water in the tank, and the average temperature value.

2. The system as claimed in claim 1, wherein the control unit is further configured to:
   monitor the temperature and the flow rate of the hot water and the cold water entering and exiting the thermal storage tank at a series of time steps; and
   generate the temperature profile as a function of time for the thermal storage tank based at least on the current location of each water layer of the plurality of water layers in the thermal storage tank, the flow rate and the temperature of the hot water and the cold water at each time step and the average temperature value measured at each time step.

3. The system as claimed in claim 1, wherein the control unit is further configured to:
   determine the current location of each water layer of the plurality of water layers in the thermal storage tank when a portion of water stored in a variable volume portion of the pair of variable volume portions is moved to a constant volume portion located adjacent to the variable volume portion,
   wherein the portion of water in the variable volume portion is moved to the constant volume portion when the variable volume portion attains a filled condition.

4. The system as claimed in claim 1, wherein the control unit is further configured to:
   determine at least one parameter related to thermal effects associated with the thermal storage tank at each time step, wherein the temperature profile of the thermal storage tank is altered based at least on the at least one parameter related to the thermal effects.

5. The system as claimed in claim 4, wherein the at least one parameter related to the thermal effects comprises one of:
   thermal loss associated with the thermal storage tank;
   thermal transfers between each consecutive water layer of the plurality of water layers;
   loss buoyant flow; and
   inversion buoyant flow.

6. The system as claimed in claim 1, wherein the control unit is configured to determine an operating time of water heating or cooling for recharging the volume of hot water and the volume of cold water within the thermal storage tank, the operating time being determined based at least on the temperature profile of the thermal storage tank.

7. The system as claimed in claim 6, wherein the control unit is further configured to:
   control water heating or cooling based at least on the temperature profile of the thermal storage tank, the operating time and an operation cycle, the operation cycle being one of an on-peak operation cycle and an off-peak operation cycle.

8. The system as claimed in claim 7, wherein the control unit is further configured to:
   control water heating or cooling instantaneously for recharging the hot water or the cold water within the thermal storage tank in the on-peak operation cycle; and
   control water heating or cooling selectively based at least on costs, emissions and a schedule of operation of a power source for recharging the hot water or the cold water in the off peak operation cycle, the costs and the schedule of operation of the power source are defined in a look-up table configured in a database communicably coupled to the control unit.

9. The system as claimed in claim 1, wherein the hot water or the cold water is selectively routed to at least one of:
a thermal distributor via a pump, fluidically coupled to the thermal storage tank, to deliver heating or cooling to an enclosure for conditioning.

10. The system as claimed in claim 1, wherein the thermal storage tank includes the hot water settled at a top portion of the thermal storage tank, tepid water settled at a middle portion of the thermal storage tank, and the cold water settled at a bottom portion of the thermal storage tank.

11. A method, comprising:
monitoring, by a control unit, a respective flow rate of at least a volume of hot water and a volume of cold water entering a thermal storage tank over a time step via a set of flowmeters, wherein a respective current location of each position of the plurality of water layers within the thermal storage tank is altered based on at least a volume of hot water and a volume of cold water entering the thermal storage tank;
monitoring, by the control unit, a respective temperature of each of at least the volume of hot water and the volume of cold water entering the thermal storage tank over the time step via a set of temperature sensors;
determining, by the control unit, a respective current location of each of the plurality of water layers in the thermal storage tank based at least on the volume of hot water and the volume of cold water entered within and exited from the thermal storage tank and dimensions of the thermal storage tank;
computing, by the control unit, an average temperature value of the at least the hot water and the cold water exited from the thermal storage tank over the time step; and
generating, by the control unit, a temperature profile of the thermal storage tank for the time step based at least on the respective current location of each of the plurality of water layers, the flow rate and the respective temperature of at least the hot water and the cold water in the tank, and the average temperature value.

12. The method as claimed in claim 11, further comprising:
monitoring, by the control unit, the temperature and the flow rate of the hot water and the cold water entering and exiting the thermal storage tank at a series of time steps; and
generating, by the control unit, the temperature profile as a function of time for the thermal storage tank based at least on a current location of each water layer of the plurality of water layers in the thermal storage tank, the flow rate and the temperature of the hot water and the cold water at each time step and the average temperature value measured at each time step.

13. The method as claimed in claim 11, further comprising:
determining, by the control unit, the current location of each water layer of the plurality of water layers in the thermal storage tank when a portion of water stored in a variable volume portion of a pair of variable volume portions is moved to a constant volume portion located adjacent to the variable volume portion, wherein the portion of water in the variable volume portion is moved to the constant volume portion when the variable volume portion attains a filled condition.

14. The method as claimed in claim 11, further comprising:
determining, by the control unit, at least one parameter related to thermal effects associated with the thermal storage tank at each time step, wherein the temperature profile of the thermal storage tank is altered based at least on the at least one parameter related to thermal effects.

15. The method as claimed in claim 14, wherein the at least one parameter related to thermal effects comprises one of:
thermal loss associated with the thermal storage tank;
thermal transfers between each consecutive water layer of the plurality of water layers;
loss buoyant flow; and
inversion buoyant flow.

16. The method as claimed in claim 11, further comprising:
determining, by the control unit, an operating time of water heating or cooling for recharging the volume of hot water and the volume of cold water within the thermal storage tank, the operating time being determined based at least on the temperature profile of the thermal storage tank.

17. The method as claimed in claim 16, further comprising:
controlling, by the control unit, water heating or cooling based at least on the temperature profile of the thermal storage tank, the operating time and an operation cycle, the operation cycle being one of an on-peak operation cycle and an off-peak operation cycle.

18. The method as claimed in claim 17, further comprising:
controlling, by the control unit, water heating or cooling instantaneously for recharging the hot water or the cold water within the thermal storage tank in the on-peak operation cycle; and
controlling, by the control unit, water heating or cooling selectively based at least on costs, emissions and a schedule of operation of a power source for recharging the hot water or the cold water in the off-peak operation cycle, the costs and the schedule of operation of the power source are defined in a look-up table configured in a database communicably coupled to the control unit.

19. The method as claimed in claim 11, wherein the hot water or the cold water is selectively routed to at least one of:
a thermal distributor via a pump, fluidically coupled to the thermal storage tank, to deliver heating or cooling to an enclosure for conditioning.

20. The method as claimed in claim 11, wherein the thermal storage tank includes the hot water settled at a top portion of the thermal storage tank, tepid water settled at a middle portion of the thermal storage tank, and the cold water settled at a bottom portion of the thermal storage tank.

* * * * *